United States Patent
Miura et al.

(10) Patent No.: US 10,796,570 B2
(45) Date of Patent: Oct. 6, 2020

(54) VEHICLE CONTROL DEVICE, VEHICLE CONTROL METHOD, AND STORAGE MEDIUM

(71) Applicant: HONDA MOTOR CO., LTD., Minato-ku, Tokyo (JP)

(72) Inventors: Hiroshi Miura, Wako (JP); Makoto Ishikawa, Wako (JP); Masamitsu Tsuchiya, Wako (JP); Koji Kawabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 16/121,788

(22) Filed: Sep. 5, 2018

(65) Prior Publication Data
US 2019/0080600 A1    Mar. 14, 2019

(30) Foreign Application Priority Data

Sep. 8, 2017   (JP) ................................ 2017-173033

(51) Int. Cl.
G06K 9/00    (2006.01)
G08G 1/0962  (2006.01)
G06K 9/46    (2006.01)

(52) U.S. Cl.
CPC ..... *G08G 1/09623* (2013.01); *G06K 9/00201* (2013.01); *G06K 9/00791* (2013.01); *G06K 9/00818* (2013.01); *G06K 9/4638* (2013.01); *G08G 1/09626* (2013.01); *B60L 2240/12* (2013.01); *B60L 2250/16* (2013.01)

(58) Field of Classification Search
CPC ............. B60L 2240/12; B60L 2250/16; G06K 9/00201; G06K 9/00791; G06K 9/00805
USPC ........................................................ 382/104
See application file for complete search history.

(56) References Cited

U.S. PATENT DOCUMENTS 10,234,946 B2 *  3/2019  Tanaka .................. G06F 3/0488

FOREIGN PATENT DOCUMENTS

| JP | 2007-137085 | 6/2007 |
| JP | 2013-228987 | 11/2013 |
| JP | 2014-137611 | 7/2014 |
| JP | 2015-009599 | 1/2015 |
| WO | 2014/083821 | 6/2014 |

OTHER PUBLICATIONS

Japanese Office Action for Japanese Patent Application No. 2017-173033 dated Apr. 2, 2019.

* cited by examiner

Primary Examiner — Charlotte M Baker
(74) Attorney, Agent, or Firm — Amin, Turocy & Watson, LLP

(57) ABSTRACT

A vehicle control device (100) includes: a detection device having a detection area in an advancement direction of a vehicle; and a crossing recognizer (132) determining whether or not a concave part extending in a direction intersecting the advancement direction is present on the basis of an output of the detection device and recognizing presence of a crossing in the advancement direction of the vehicle in a case in which a concave part is determined as being present.

4 Claims, 26 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2017-173033, filed on Sep. 8, 2017, the content of which is incorporated herein by reference.

BACKGROUND

Field of the Invention

The present invention relates to a vehicle control device, a vehicle control method, and a storage medium.

Description of Related Art

In recent years, automatic control of vehicles has been researched. In this field, it is an important task to accurately recognize surrounding situations of vehicles. While various objects are included in the surrounding situations of vehicles, as one thereof, there is a crossing located at a position at which a railroad track and a road intersect.

Technologies for recognizing the presence of a crossing have been disclosed (for example, Japanese Unexamined Patent Application, First Publication No. 2015-9599). For example, an invention of a device has been disclosed which includes: a position measuring unit that measures the current position of a vehicle; an area determiner that determines whether or not the current position of the vehicle measured by the position measuring unit is within a predetermined area in which a likelihood of colliding with an object is higher than in a running road in accordance with a rapid depression of an acceleration pedal; and a running controller that performs control such that the running of the vehicle is inhibited in a case in which it is determined that the vehicle is inside the predetermined area by the area determiner during running of the vehicle at a predetermined speed or less or stopping thereof, control conditions are satisfied, and the amount of change in the amount of depression of the acceleration pedal per unit time exceeds a threshold (see Patent Document 1). In this device, a crossing is included in the predetermined area, and lowering of a crossing gate of a crossing, turning-on of a colored light of a crossing, and sounding of an alarm bell of a crossing are included in the control conditions.

SUMMARY OF THE INVENTION

However, in this conventional technology, there are cases in which the presence of a crossing cannot be recognized with a sufficient degree of certainty. For example, a crossing gate of a crossing is, generally, formed in a thin rod shape and thus may be overlooked in image recognition of a camera. It is difficult to distinguish between a colored light and a traffic signal, and, in order to recognize the sound of an alarm bell, a microphone and a sound recognizing device having a high accuracy need to be provided.

The present invention is in view of such situations, and one object thereof is to provide a vehicle control device, a vehicle control method, and a storage medium capable of improving the degree of certainty in recognition of a crossing.

A vehicle control device, a vehicle control method, and a storage medium according to the present invention employ the following configurations.

(1): A vehicle control device according to one aspect of the present invention is a vehicle control device including: a detection device having a detection area in an advancement direction of a vehicle; and a crossing recognizer determining whether or not a concave part extending in a direction intersecting the advancement direction is present on the basis of an output of the detection device and recognizing presence of a crossing in the advancement direction of the vehicle in a case in which a concave part is determined as being present.

(2): In the aspect (1) described above, the detection device includes a camera (10) that images the vicinity of the vehicle, and the crossing recognizer determines whether or not a concave part is present on the basis of an image captured by the camera.

(3): In the aspect (1) described above, the detection device includes a finder (14) that detects an object in the vicinity of the vehicle by emitting light and receiving reflected light, and the crossing recognizer determines whether or not a track extending in a direction intersecting the advancement direction is present on the basis of a detection result acquired by the finder and raises a degree of certainty in the presence of a crossing in a case in which the track is determined as being present.

(4): In the aspect (1) described above, the crossing recognizer recognizes the presence of a crossing in a case in which it is determined that a plurality of concave parts are determined as being present in parallel with each other by the determination unit.

(5): A vehicle control method according to another aspect of the present invention is a vehicle control method executed by a computer mounted in a vehicle including a detection device having a detection area in an advancement direction of the vehicle. The vehicle control method includes: determining whether or not a concave part extending in a direction intersecting the advancement direction is present on the basis of an output of the detection device; and recognizing presence of a crossing in the advancement direction of the vehicle in a case in which a concave part is determined as being present.

(6): A program according to another aspect of the present invention is a program causing a computer, which is mounted in a vehicle including a detection device having a detection area in an advancement direction of the vehicle, to execute: determining whether or not a concave part extending in a direction intersecting the advancement direction is present on the basis of an output of the detection device; and recognizing presence of a crossing in the advancement direction of the vehicle in a case in which a concave part is determined as being present.

According to aspects of (1), (2), and (4) to (6) described above, the degree of certainty in recognition of a crossing can be improved.

According to an aspect of (3) described above, the degree of certainty in recognition of a crossing can be further improved.

DETAILED DESCRIPTION OF THE INVENTION

Hereinafter, a vehicle control device, a vehicle control method, and a storage medium according to embodiments of the present invention will be described with reference to the drawings. In the following description, a region in which vehicles run is assumed to be a left-traffic region. The left side and the right side may be read by being interchanged for a right-traffic region.

First Embodiment

[Entire Configuration]

Figure 1:
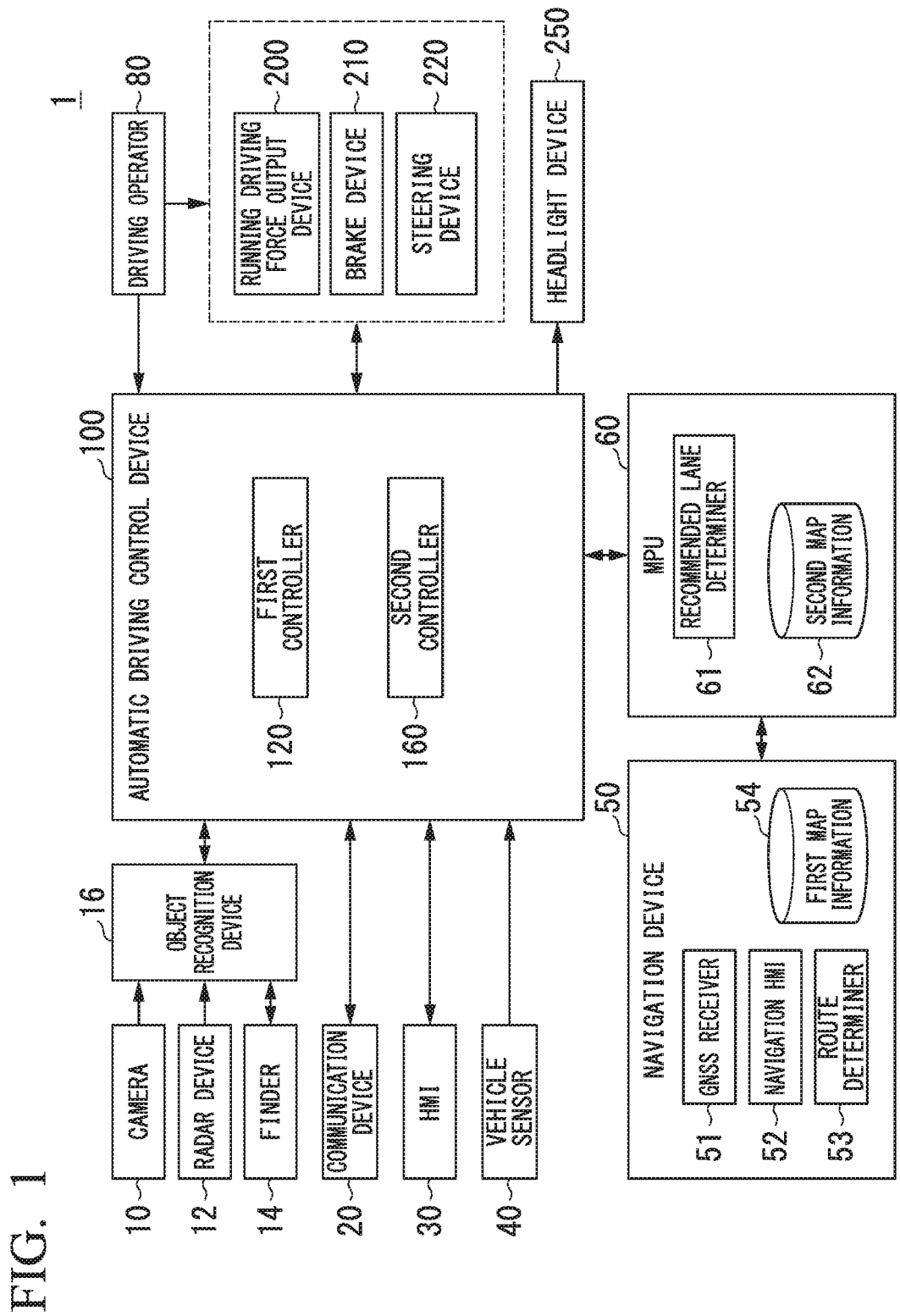
FIG. 1 is a configuration diagram of a vehicle system using a vehicle control device according to a first embodiment.

FIG. 1 is a configuration diagram of a vehicle system 1 using a vehicle control device according to a first embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automatic driving control device 100, a running driving force output device 200, a brake device 210, a steering device 220, and a headlight device 250. Such devices and units are interconnected using a multiplex communication line such as a controller area network (CAN) communication line, a serial communication line, a radio communication network, or the like. The configuration illustrated in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth to) of an object by detecting radiowaves (reflected waves) reflected by the object. One or a plurality of radar devices 12 are installed at arbitrary places on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattered light. The finder 14 detects a distance to a target on the basis of a time from light emission to light reception. The emitted light emitted using the finder 14, for example, is pulsed laser light. One or a plurality of finders 14 are installed at arbitrary places on the subject vehicle M. The finder 14 is one example of an object detecting device.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automatic driving control device 100. In addition, the object recognizing device 16, as is necessary, may output results of detection using the camera 10, the radar device 12, and the finder 14 to the automatic driving control device 100 as they are.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, an illuminance sensor that detects an illuminance of the surroundings of the subject vehicle M, and the like.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 40. The navigation HMI 52 includes a display device, a speaker, a touch panel, a key, and the like. A part or the whole of the navigation HMI 52 and the HMI 30 described above may be configured to be shared. The route determiner 53, for example, determines a route from a location of the subject vehicle M identified by the GNSS receiver 51 (or an input arbitrary location) to a destination input by a vehicle occupant using the navigation HMI 52 (hereinafter, referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map determined by the route determiner 53 is output to the MPU 60. In addition, the navigation device 50 may perform route guidance using the navigation HMI 52 on the basis of the route on the map determined by the route determiner 53. The navigation device 50, for example, may be realized by a function of a terminal device such as a smartphone or a tablet terminal held by a vehicle occupant. In addition, the navigation device 50 may transmit a current location and a destination to a navigation server through the communication device 20 and acquire a route on the map received from the navigation server as a reply.

The MPU 60, for example, functions as a recommended lane determiner 61 and maintains second map information 62 in a storage device such as a HDD or a flash memory. The recommended lane determiner 61 divides a route provided from the navigation device 50 into a plurality of blocks (for example, divides the route into blocks of 100 [m] in the advancement direction of the vehicle) and determines a recommended lane for each block by referring to the second map information 62. The recommended lane determiner 61 determines on which of lanes numbered from the left side to run. In a case in which a branching place, a merging place, or the like is present in the route, the recommended lane determiner 61 determines a recommended lane such that the subject vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. By accessing another device using the communication device 20, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automatic driving control device 100 or some or all of the running driving force output device 200, the brake device 210, and the steering device 220.

The automatic driving control device 100, for example, includes a first controller 120, and a second controller 160. Each of the first controller 120 and second controller 160, for example, is realized by a hardware processor such as a central processing unit (CPU) executing a program (software). In addition, some or all of such constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by cooperation between software and hardware.

Figure 2:
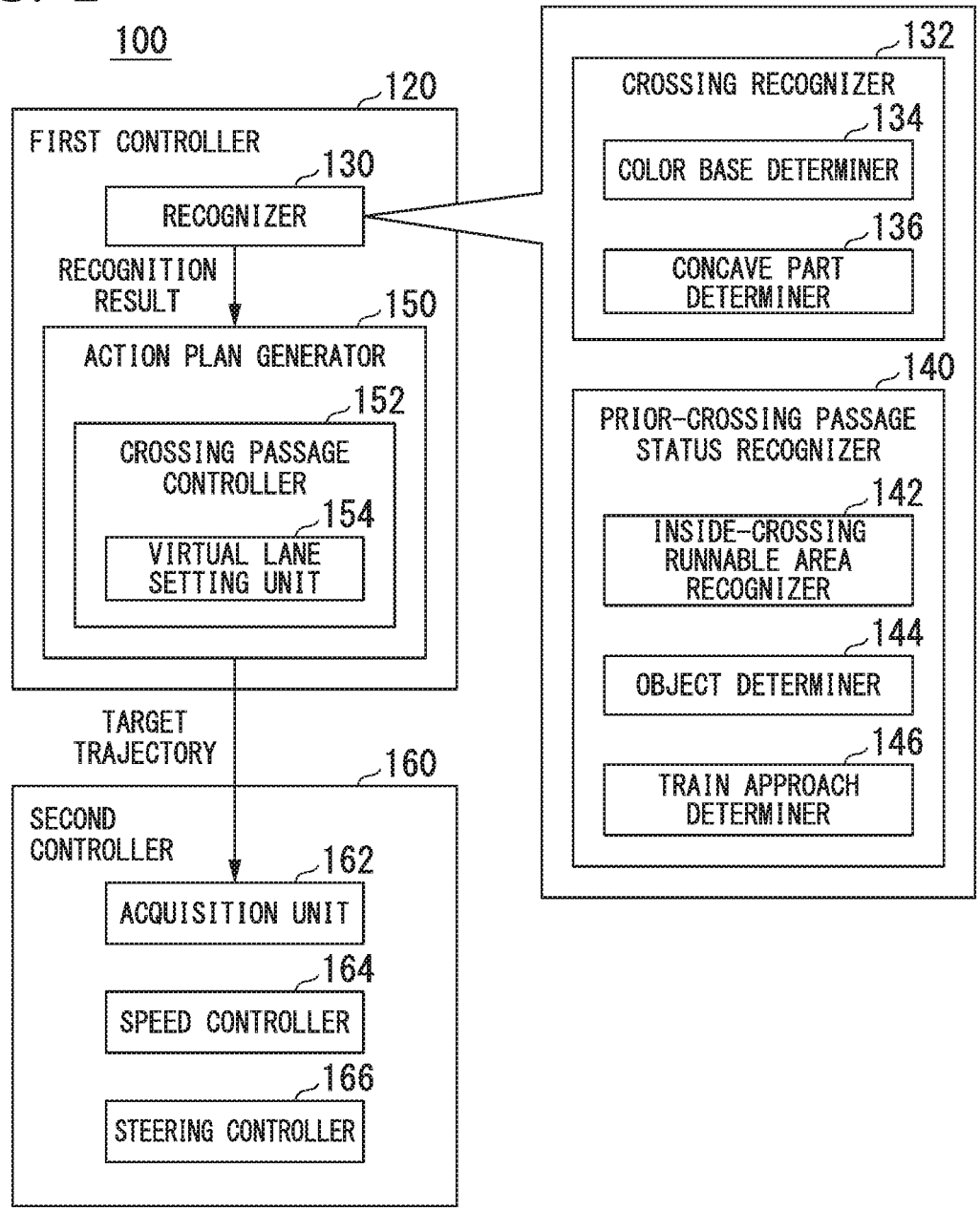
FIG. 2 is a functional diagram of a first controller and a second controller.

FIG. 2 is a functional configuration diagram of the first controller 120 and the second controller 160. The first controller 120, for example, includes a recognizer 130 and an action plan generator 150. The first controller 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a signal, road markings, and the like that can be used for pattern matching are present) at the same time and comprehensively evaluating by scoring both thereof. Accordingly, the reliability of automatic driving is secured.

The recognizer 130 includes a crossing recognizer 132 and a prior-crossing passage status recognizer 140. The action plan generator 150 includes a crossing passage controller 152. The functions of such components will be described later. First, the basic functions of the recognizer 130 and the action plan generator 150 will be described.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin and is used for a control process. The position of an object may be represented as a representative point such as the center of gravity or a corner of an object or may be represented as a representative area. A "state" of an object may include an acceleration or a jerk of an object or an "action state" (for example, the object is changing lane or is to change lane) of an object. In addition, the recognizer 130 recognizes the shape of a curve through which the subject vehicle M will pass subsequently on the basis of a captured image captured by the camera 10. The recognizer 130 converts the shape of the curve in the captured image captured by the camera 10 into one on an actual plane and, for example, outputs two-dimensional point sequence information or information expressed using a model equivalent thereto to the action plan generator 150 as information representing the shape of the curve.

The recognizer 130, for example, recognizes a lane (running lane) in which the subject vehicle M runs. For example, the recognizer 130 compares a pattern of road partition lines acquired from the second map information 62 (for example, an array of solid lines and broken lines) with a pattern of road partition lines in the vicinity of the subject vehicle M that has been recognized from an image captured by the camera 10, thereby recognizing a running lane. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle object, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the subject vehicle M with respect to a line extending along the center of the lane in the advancement direction as a relative position and a posture of the subject vehicle M with respect to the running lane. Instead of this, the recognizer 130 may recognize a position of a reference point on the subject vehicle M with respect to one of side end parts (a road partition line or a road boundary) of the running lane or the like as a relative position of the subject vehicle M with respect to the running lane.

In the recognition process described above, the recognizer 130 may derive a recognition accuracy and output the derived recognition accuracy to the action plan generator 150 as recognition accuracy information. For example, the recognizer 130 may generate recognition accuracy information on the basis of a frequency at which a road partition line is recognized over a predetermined time period.

The action plan generator 150 determines events to be sequentially executed in automatic driving such that the subject vehicle basically runs on a recommended lane determined by the recommended lane determiner 61 and can respond to a surroundings status of the subject vehicle M. As the events, for example, there are a constant-speed running event for running at a constant speed in the same running lane, a following running event of following a vehicle running ahead, an overtaking event of overtaking a vehicle running ahead, an avoidance event of performing braking and/or steering for avoiding approaching an obstacle object, a curved running event of running on a curve, a passing through event for passing through a predetermined point such as an intersection, a pedestrian crossing, a railroad crossing, or the like, a lane change event, a merging event, a branching event, an automatic stopping event, a takeover event for ending automatic driving and switching to manual driving, and the like.

The action plan generator 150 generates a target trajectory along which the subject vehicle M will run in the future in accordance with operating events. Details of each functional unit will be described later. The target trajectory, for example, includes a speed element. For example, the target trajectory is represented by sequentially aligning places (trajectory points) at which the subject vehicle M is to arrive. A trajectory point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target trajectory. A trajectory point may be a position at which the subject vehicle M will arrive at a sampling time for each predetermined sampling time. In such a case, information of a target speed or a target acceleration is represented using intervals between the trajectory points.

Figure 3:
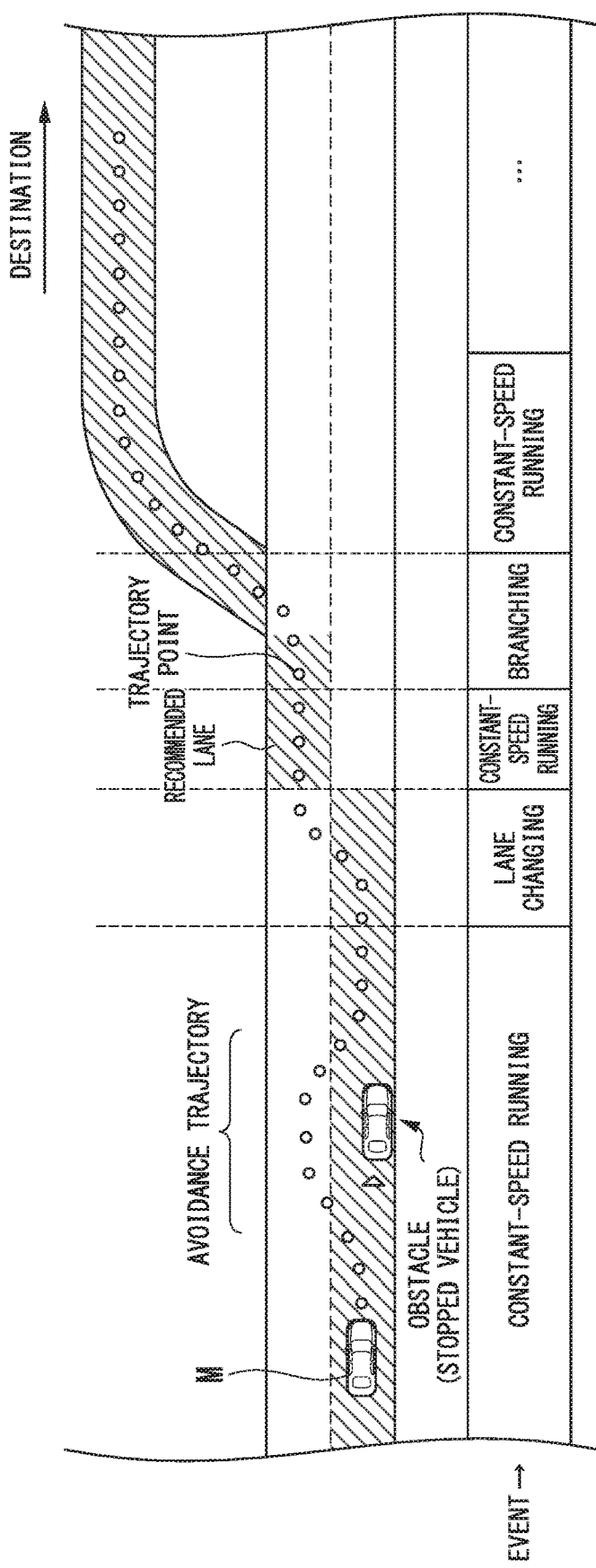
FIG. 3 is a diagram illustrating a view in which a target trajectory is generated on the basis of a recommended lane.

FIG. 3 is a diagram illustrating a view in which a target trajectory is generated on the basis of recommended lanes. As illustrated in the drawing, the recommended lanes are set such that surroundings are convenient for running along a route to a destination. When reaching a predetermined distance before a place at which a recommended lane is changed (may be determined in accordance with a type of event), the action plan generator 150 executes the passing through event, the lane change event, the branching event, the merging event, or the like. During execution of each event, in a case in which there is a need to avoid an obstacle object, an avoidance trajectory is generated as illustrated in the drawing.

The second controller 160 performs control of the running driving force output device 200, the brake device 210, and the steering device 220 such that the subject vehicle M passes along a target trajectory generated by the action plan generator 150 at a scheduled time.

Referring back to FIG. 2, the second controller 160, for example, includes an acquisition unit 162, a speed controller 164, and a steering controller 166. The acquisition unit 162 acquires information of a target trajectory (trajectory point) generated by the action plan generator 150 and stores the target trajectory in a memory (not illustrated). The speed controller 164 controls the running driving force output device 200 or the brake device 210 on the basis of a speed element accompanying the target trajectory stored in the memory. The steering controller 166 controls the steering device 220 in accordance with a degree of curvature of the target trajectory stored in the memory. The processes of the speed controller 164 and the steering controller 166, for example, are realized by a combination of feed forward control and feedback control. For example, the steering controller 166 may execute feed forward control according to the curvature of a road in front of the subject vehicle M and feedback control based on a deviation from the target trajectory in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

The headlight device 250 is a device that irradiates the side in front of the subject vehicle M and, for example, is an adaptive front lighting system (AFS) that can automatically horizontally change a radiation direction in accordance with a steering angle. The headlight device 250 performs switching between high-beam radiation and low-beam radiation in accordance with an instruction from the outside. The low-beam radiation is radiation for the side in front of the subject vehicle M at a constant depression angle, and the high-beam radiation is radiation for further forward on the side in front of the subject vehicle M at an angle of an optical axis further upward than in the low-beam radiation.

Hereinafter, details of a process performed in the case of a crossing passage using the vehicle system 1 will be described. As illustrated in FIG. 2, the crossing recognizer 132 of the recognizer 130 includes a color base determiner 134 and a concave part determiner 136.

[Recognition of Crossing]

For example, in a case in which information indicating the presence of a crossing within a predetermined distance (for example, about 2 [km]) from a running destination of the subject vehicle M is acquired from an MPU 60, the crossing recognizer 132 determines that the presence of a crossing has been recognized and starts an operation. At this time point, the vehicle control device determines that there is room for doubt in the degree of certainty of the presence of a crossing. Then, the degree of certainty in the presence of a crossing is raised by a process described below and starting/not starting crossing passage control and/or details of the process are determined. The degree of certainty is an internal parameter managed by the crossing recognizer 132 and is a value or a flag stored in a memory of the automatic driving control device 100. The crossing recognizer 132 may operate constantly regardless of information representing the presence of a crossing in accordance with a map and spontaneously recognize the presence of a crossing.

(Recognition of Crossing Using Specific Color)

Hereinafter, the function of the color base determiner 134 will be described. The color base determiner 134 raises the degree of certainty in the presence of a crossing at a running destination of the subject vehicle on the basis of an element of a specific color, which represents the presence of a crossing, included in an image captured by the camera 10. Here, although the specific color is different depending on the country in which a crossing is present, for example, it may be a combination of two colors such as yellow and black or red and white. Hereinafter, these two colors will be respectively referred to as a first color and a second color.

Figure 4:
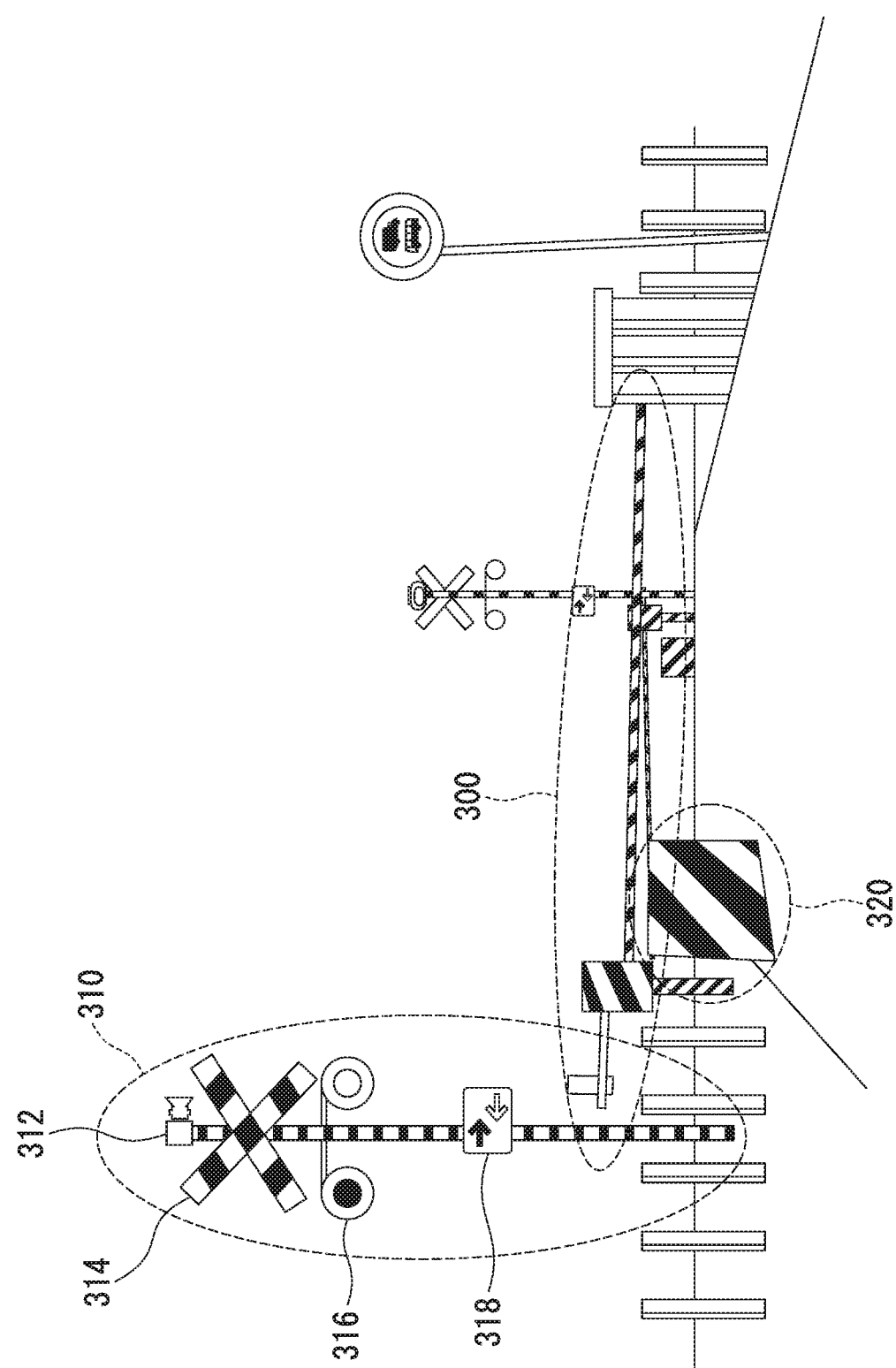
FIG. 4 is a diagram illustrating one example of an image acquired by imaging a crossing.

FIG. 4 is a diagram illustrating one example of an image acquired by imaging a crossing. At a crossing, for example, between a place before passage of a train and a place at which the passage is completed, a crossing gate 300 for blocking crossing of a track, a crossing alarm 310 used for notifying of approach and passage of a train using sound and lighting, a protective wall 320 used for limiting a road width at the entrance of the crossing, and the like are installed. In the crossing alarm 310, an alarm sound generator 312, a crossing warning sign 314, a warning lamp 316, a direction indicator 318, and the like are disposed. Among these, in the crossing warning sign 314 and the protective wall 320, painting in which a first color and a second color are arranged periodically and alternatively over a relatively large rage is formed.

Figure 5:
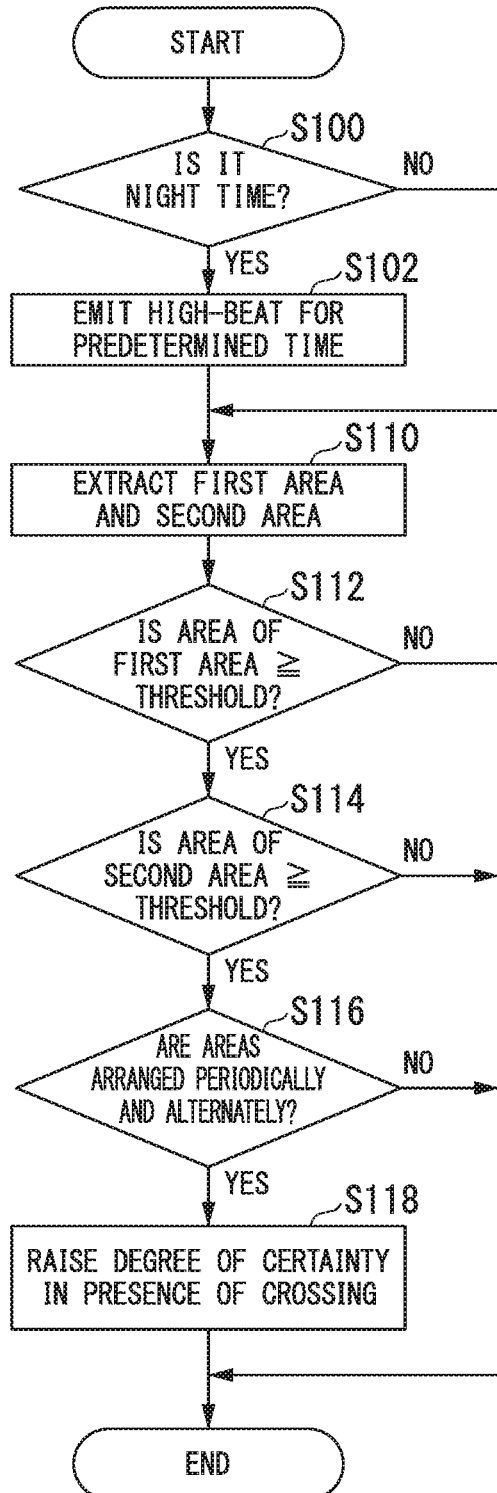
FIG. 5 is a flowchart (1) illustrating one example of details of a process performed by a color base determiner.

FIG. 5 is a flowchart (1) illustrating one example of details of a process performed by the color base determiner 134. First, the color base determiner 134 determines whether or not a determination time point is a night time (Step S100). For example, in a case in which an illuminance detected by an illuminance sensor included in the vehicle sensor 40 is less than a threshold Th1, the color base determiner 134 determines that it is night time. Instead of this, the color base determiner 134 may determine whether or not it is night time on the basis of time measured by a clock held inside. In the latter case, a determination criterion may be changed with the season taken into account. In a case in which it is determined that it is night time, the color base determiner 134 instructs the headlight device 250 to perform the high-beam radiation for a predetermined time (Step S102). In this way, the success rate of the image recognition can be increased.

Next, the color base determiner 134 extracts a first area corresponding to the first color and a second area corresponding to the second color in an image captured by the camera 10 (Step S110). Since index values representing intensities of RGB components can be acquired for each pixel (or a pixel group, hereinafter the same) from a captured image of the camera 10, the color base determiner 134 determines a pixel corresponding to the first color or the second color in a case in which the intensity values are within a range of reference values (may including an upper limit and a lower limit) corresponding to the first color or the second color. Then, the color base determiner 134 extracts an area in which pixels corresponding to the first color or the second color are grouped as a first-color area or a second-color area. Here, although it is assumed that pixels of other than the first color or the second color may be incorporated in the area due to a state of light, the color base determiner 134 may perform a process of eliminating such a pixel or the like as a singular value.

Next, the color base determiner 134 determines whether or not the area of the first area is equal to or greater than a threshold Th2 with respect to the whole area of the image (Step S112). Here, in a case in which there are a plurality of first areas, the area of the first area, for example, is a sum of the areas thereof. In a case in which the area of the first area is equal to or greater than the threshold Th2 with respect to the whole area of the image, the color base determiner 134 determines whether or not the area of the second area with respect to the area of the whole image is equal to or greater than a threshold Th3 (Step S114). Here, in a case in which there are a plurality of second areas, the area of the second area, for example, is a sum of the areas thereof. The threshold Th2 and the threshold Th3 may have either different values or the same value. For example, the reason for this is that, although black has a high likelihood of appearing also in a part other than a crossing in an image, yellow has a low likelihood of appearing in a part other than a crossing. Thus, a threshold for black may be set higher than a threshold for yellow. In a case in which a determination result of "No" is acquired in any one of Steps S112 and S114, the color base determiner 134 does not raise the degree of certainty on the basis of a specific color. In such a case, the crossing recognizer 132 may determine that a crossing is not present when the process does not go through a further checking process.

Figure 6:
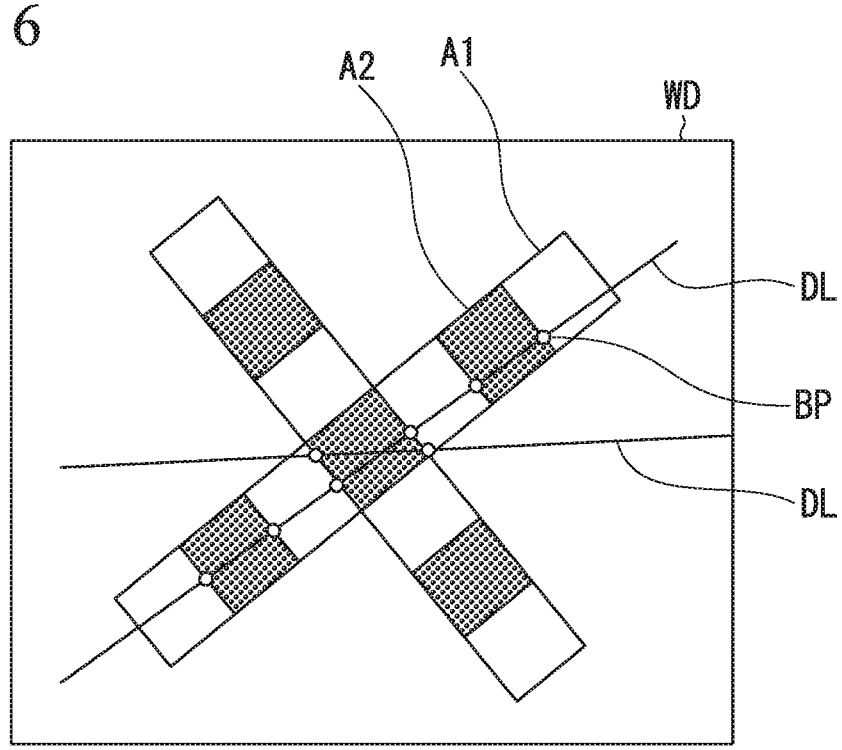
FIG. 6 is a diagram illustrating one example of a determination process using a color base determiner.

In a case in which a determination result of "Yes" is acquired in both Step S112 and Step S114, the color base determiner 134 determines whether or not the first area and the second area are arranged periodically and alternately (Step S116). FIG. 6 is a diagram illustrating one example of a determination process using the color base determiner 134. As illustrated in the drawing, the color base determiner 134, for example, sets a window area WD including first areas A1 and second areas A2, sets a plurality of scanning lines DL having different inclinations inside the window area, and determines whether or not boundary points BP between the first area A1 and the second area A2 appear at an approximately equal space on one of the scanning lines DL. Here, "appearing at an approximately equal space" represents that all the intervals between boundary points BP adjacent to each other enter a predetermined range. The predetermined range may have a width acquired by taking variations occurring in accordance with a relation between an image plane and an actual space and the like into account. In a case in which boundary points BP between the first area A1 and the second area A2 appear at an approximately equal space on any one of the scanning lines DL, the color base determiner 134 determines that the first area and the second area are arranged periodically and alternately. The method of the determination is not limited thereto, but the color base determiner 134 may perform the determination of Step S116 using a technique such as pattern matching.

Here, as described above, the first color and the second color that are specific colors are present over a relatively large area. For this reason, in a case in which the technique as illustrated in FIG. 6 is used, a sufficient number of boundary points BP between the first areas and the second areas can be detected relatively easily on a scanning line DL. In contrast to this, in a case in which a crossbar part of the crossing gate 300 is to be recognized from an image, the target is a long and narrow object, and thus, an accurate recognition process is necessary. In addition, the probability of erroneous recognition is high. The warning lamp 316 has a possibility of being erroneously recognized as a traffic sign and is originally in one color of black unless it is turned on, and thus it is difficult to determine the warning lamp 316. In this way, by recognizing a crossing on the basis of specific colors that are unique to crossings included in an image, the presence of the crossing can be recognized with a high accuracy without increasing the processing load.

Referring back to FIG. 5, in a case in which it is determined that the first areas and the second areas are arranged periodically and alternately, the color base determiner 134 raises the degree of certainty in the presence of a crossing (it is determined that the degree of certainty is raised more than in a case in which determination is made on the basis of only a map; hereinafter the same) (Step S118). In such a case, the crossing recognizer 132 notifies the action plan generator 150 and the like of the presence of a crossing with sufficient certainty. As a result, crossing passage control using the action plan generator 150 starts. On the other hand, in a case in which it is determined that the first areas and the second areas are not arranged periodically and alternately, the color base determiner 134 does not raise the degree of certainty on the basis of the specific colors.

Figure 7:
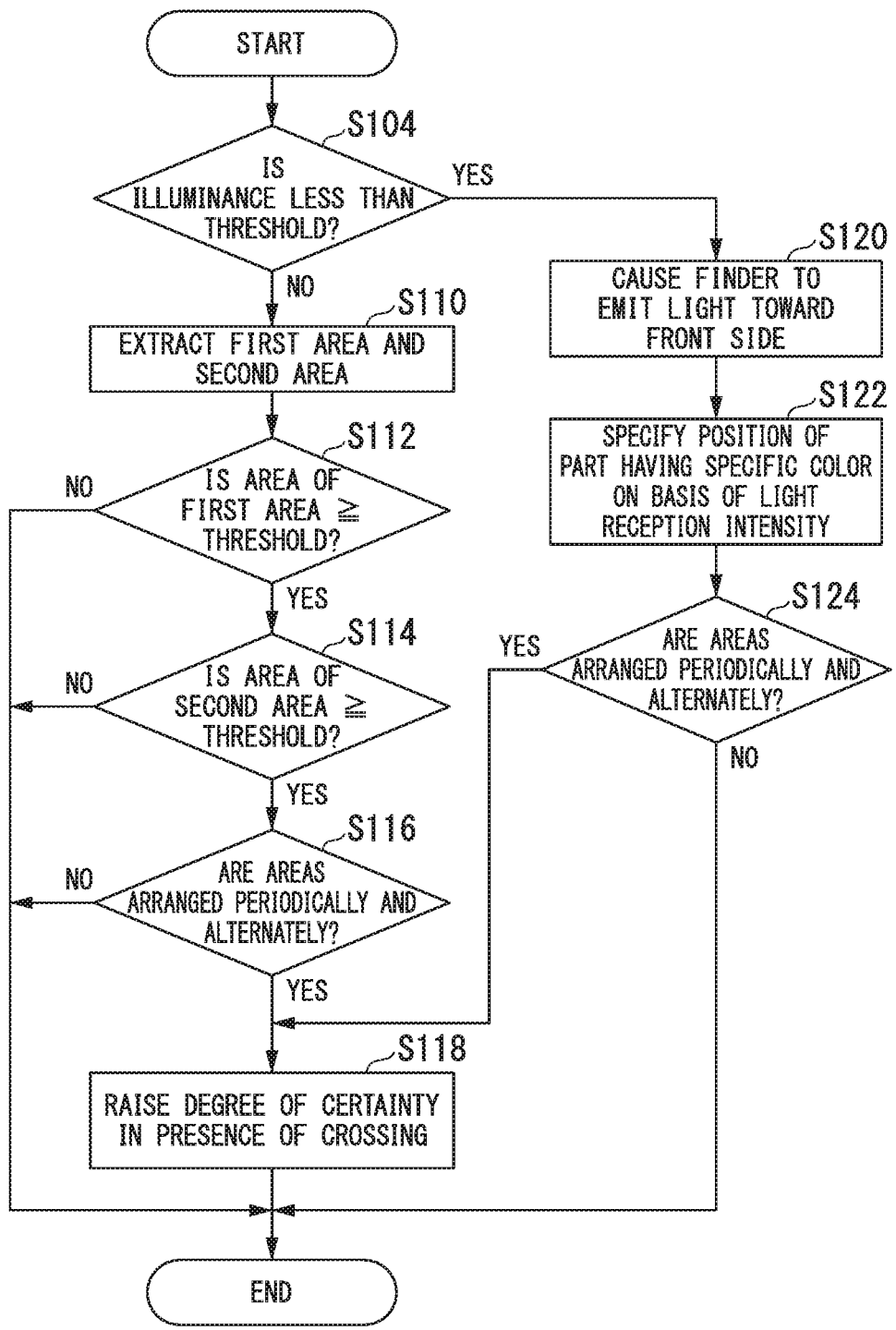
FIG. 7 is a flowchart (2) illustrating one example of details of a process performed by a color base determiner.

The color base determiner 134 may perform the process of a flowchart illustrated in FIG. 7 instead of the process of the flowchart illustrated in FIG. 5. FIG. 7 is a flowchart (2) illustrating one example of details of a process performed by the color base determiner 134.

First, the color base determiner 134 determines whether or not the illuminance of the surrounding of the subject vehicle M is less than a threshold Th4 (Step S104). For example, the color base determiner 134 determines whether or not the illuminance of the surroundings of the subject vehicle M is less than the threshold Th4 on the basis of a detection result acquired by the illuminance sensor included in the vehicle sensor 40. In a case in which the illuminance of the surroundings of the subject vehicle M is equal to or greater than the threshold Th4, the color base determiner 134 performs the process of Steps S110 to S118. The process of Steps S110 to S118 is similar to the process illustrated in the flowchart of FIG. 5, and thus, description thereof will not be presented here.

On the other hand, in a case in which the illuminance of the surroundings of the subject vehicle M is less than the threshold Th4, the color base determiner 134 instructs the finder 14 to emit light toward a side in front of the subject vehicle M (Step S120). Next, the color base determiner 134 specifies positions of parts having specific colors in a view of the side in front of the subject vehicle M on the basis of a light reception intensity of light received by the finder 14 (Step S122). Then, the color base determiner 134 determines whether or not parts of the first color and parts of the second colors are arranged periodically and alternately on the basis of the specified positions (Step S124).

Figure 8:
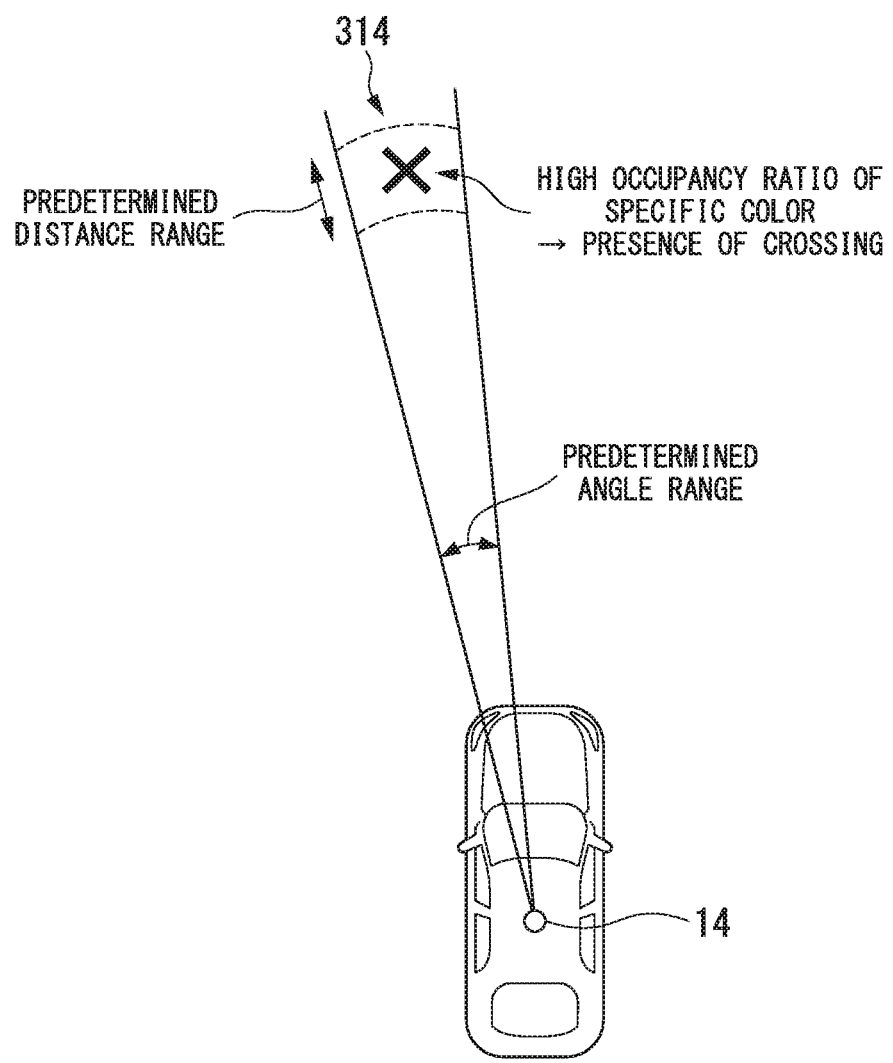
FIG. 8 is a diagram illustrating another example of a specific-color recognition technique using a finder.

Since a component of a distance is included in a detection result acquired by the finder 14 in addition to an azimuth angle and an elevation angle, the color base determiner 134 may determine whether or not parts of the first color and parts of the second color are arranged periodically and alternately at an "equal distance" in Step S124. In such a case, a likelihood of erroneously recognizing an object present at a different depth position as a part of a crossing can be decreased. The process of Step S124 may be a determination process using a more moderate condition, for example, determining "whether or not parts of the first color and parts of the second color are present at an equal distance within a predetermined range of the azimuth angle or the elevation angle and have occupancy rates of the threshold Th5 or more within a predetermined range." FIG. 8 is a diagram illustrating another example of a technique for recognizing specific colors using the finder 14. As illustrated in the drawing, the color base determiner 134 may define and scan a partial space having a predetermined angle range and a predetermined distance range and raise the degree of certainty in the presence of a crossing in a case in which a space having a high occupancy rate of the specific colors is present.

In a case in which a determination result of "No" is acquired in Step S124, the color base determiner 134 does not raise the degree of certainty in the presence of a crossing on the basis of the specific colors. On the other hand, in a case in which a determination result of "Yes" is acquired in Step S124, the color base determiner 134 raises the degree of certainty in the presence of a crossing (Step S118).

According to the process illustrated in the flowchart of FIG. 7, even in a case in which the accuracy of image recognition is decreased due to insufficient illuminance of the surroundings of the subject vehicle M, the presence of a crossing can be recognized with a high accuracy.

Figure 9:
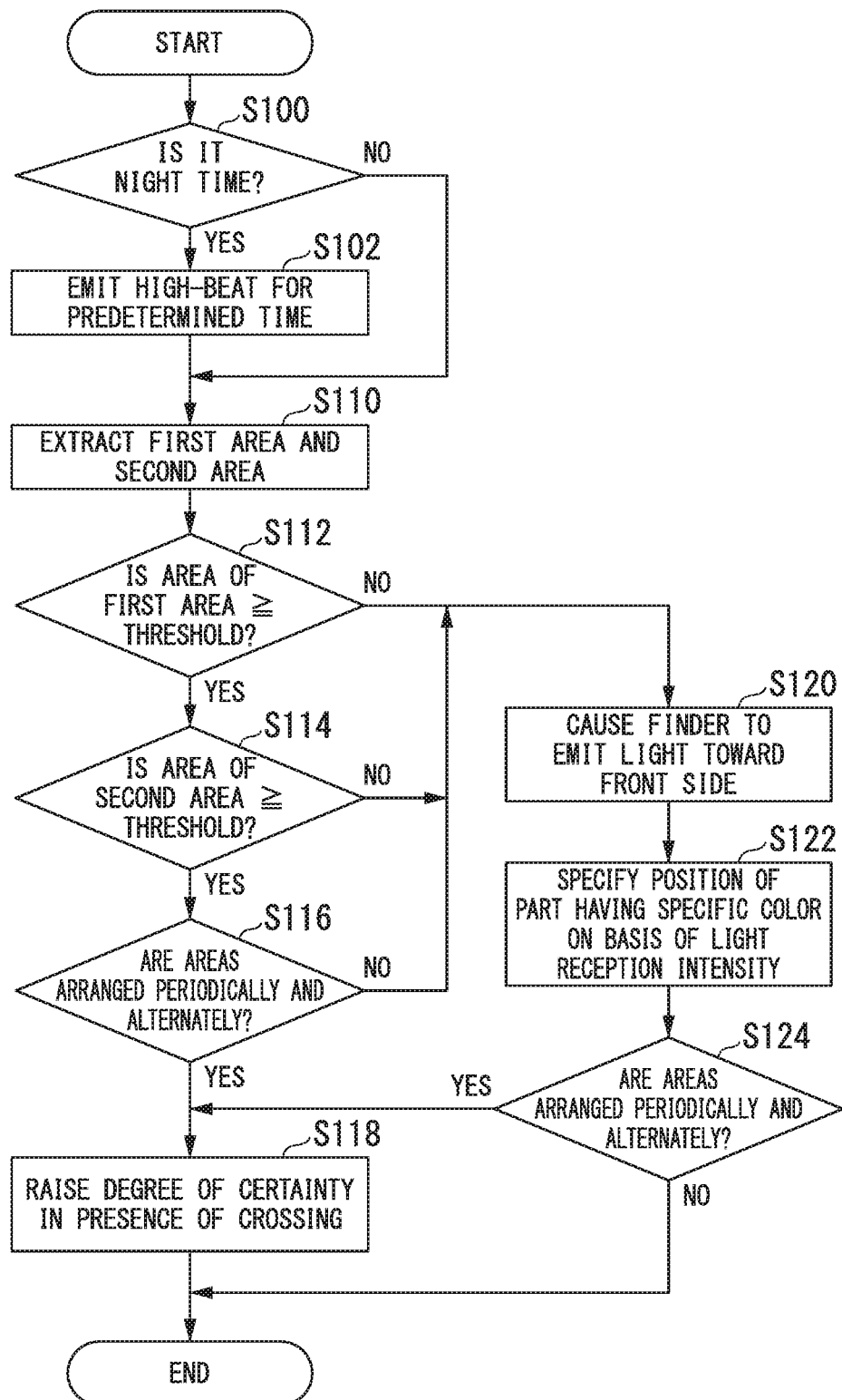
FIG. 9 is a flowchart (3) illustrating one example of details of a process performed by a color base determiner.

The color base determiner 134 may perform a process acquired by combining the process illustrated in the flowchart of FIG. 5 and the process illustrated in the flowchart of FIG. 7. FIG. 9 is a flowchart (3) illustrating one example of details of a process performed by the color base determiner 134. As illustrated in the drawing, in a case in which a determination result of "No" is determined in any one of Steps S112 to S116, the color base determiner 134 performs a process of Steps S120 to S124. On the other hand, in a case in which a determination result of "Yes" is acquired in Step S124, the color base determiner 134 raises the degree of certainty in the presence of a crossing (Step S118).

In Step S100 in the flowchart of FIG. 5, instead of determining "whether or not the time point is a night time," it may be determined "whether or not the illuminance of the surroundings of the subject vehicle M is less than the threshold Th4." In Step S104 in the flowchart illustrated in FIG. 7, instead of determining "whether or not the illuminance of the surroundings of the subject vehicle M is less than the threshold Th4," it may be determined "whether or not the time point is a night time."

As described above, by using the function of the color base determiner 134 included in the vehicle control device, the degree of certainty when a crossing is to be recognized can be raised. The kinds of specific colors may be different depending on the country, and accordingly, the color base determiner 134 may have a function of performing switching between specific colors that are recognition targets for each country in which the subject vehicle M is present.

(Recognition of Crossing Using Concave Part of Road Surface)

Hereinafter, the function of the concave part determiner 136 will be described. The concave part determiner 136 determines whether or not a concave part extending in a direction intersecting the advancement direction of the subject vehicle M is present using detection devices such as the camera 10 and the finder 14.

Figure 10:
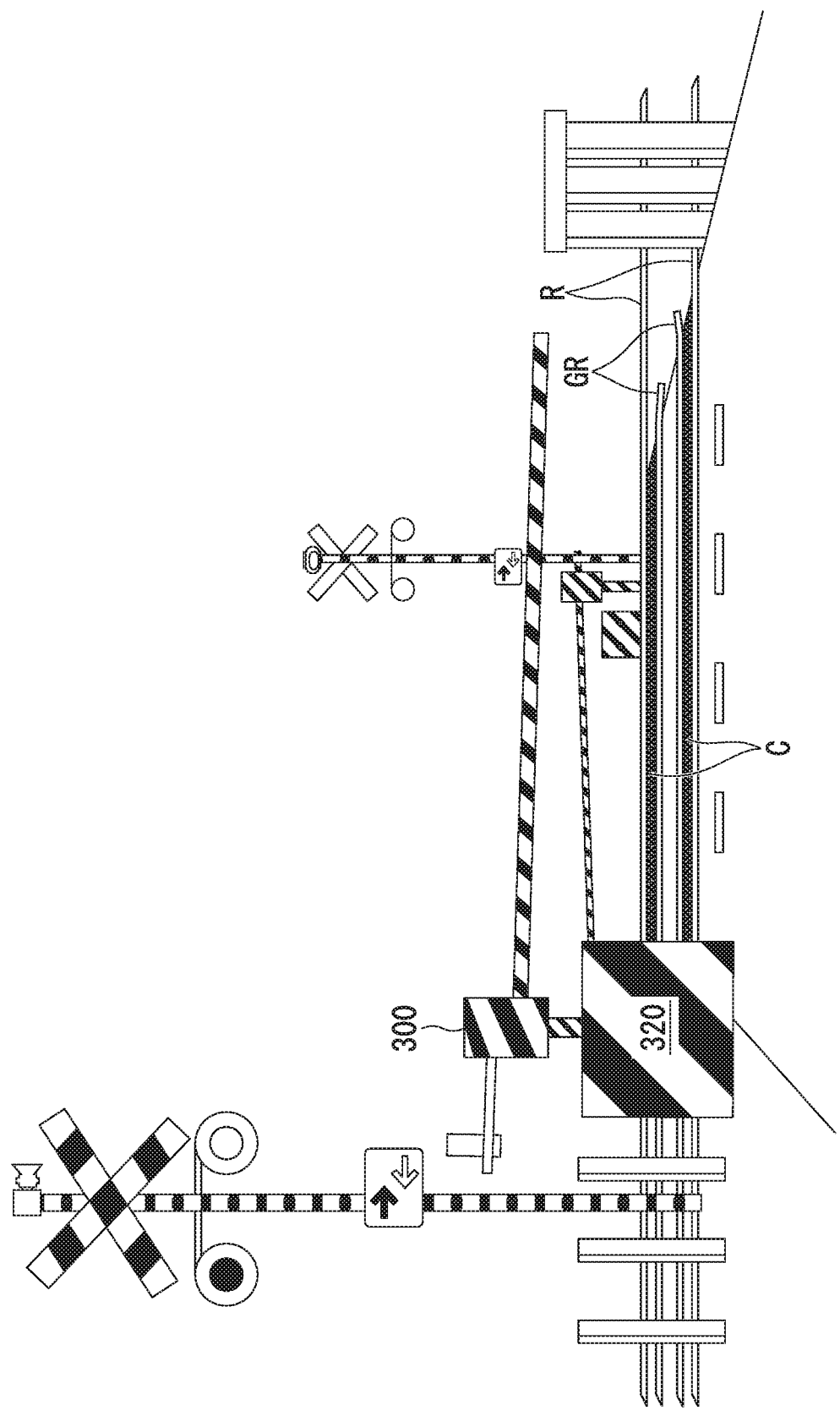
FIG. 10 is a diagram illustrating another example of an image acquired by imaging a crossing.

Inside a crossing, at least the road surface is designed to have the same height as a track. FIG. 10 is a diagram illustrating another example of an image acquired by imaging a crossing. As illustrated in the drawing, inside a crossing, guard rails GR used for securing a flange way are built inside a track R in parallel with the track R. Then, a concave part C is formed between the track R and the guard rails GR. As a result, the concave part C extends in a direction intersecting the advancement direction of the subject vehicle M. The concave part determiner 136 analyzes a captured image that is captured by the camera 10 and raises the degree of certainty in the presence of a crossing in a case in which a concave part C extending in a direction intersecting the advancement direction of the subject vehicle M is present.

Figure 11:
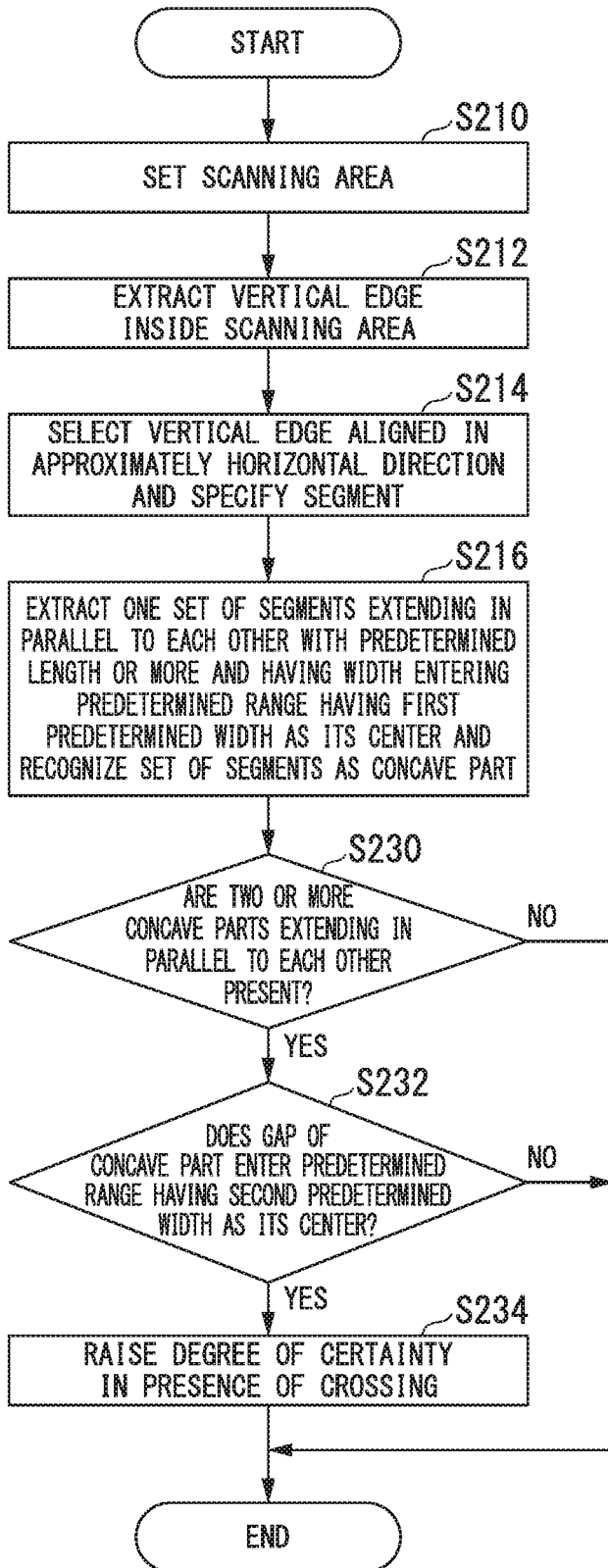
FIG. 11 is a flowchart (1) illustrating one example of details of a process executed by a concave part determiner.

FIG. 11 is a flowchart (1) illustrating one example of details of a process executed by the concave part determiner 136. First, the concave part determiner 136 sets a scanning area in an image captured by the camera 10 (Step S210).

Next, the concave part determiner 136 extracts a vertical edge inside the scanning area (Step S212).

Figure 12:
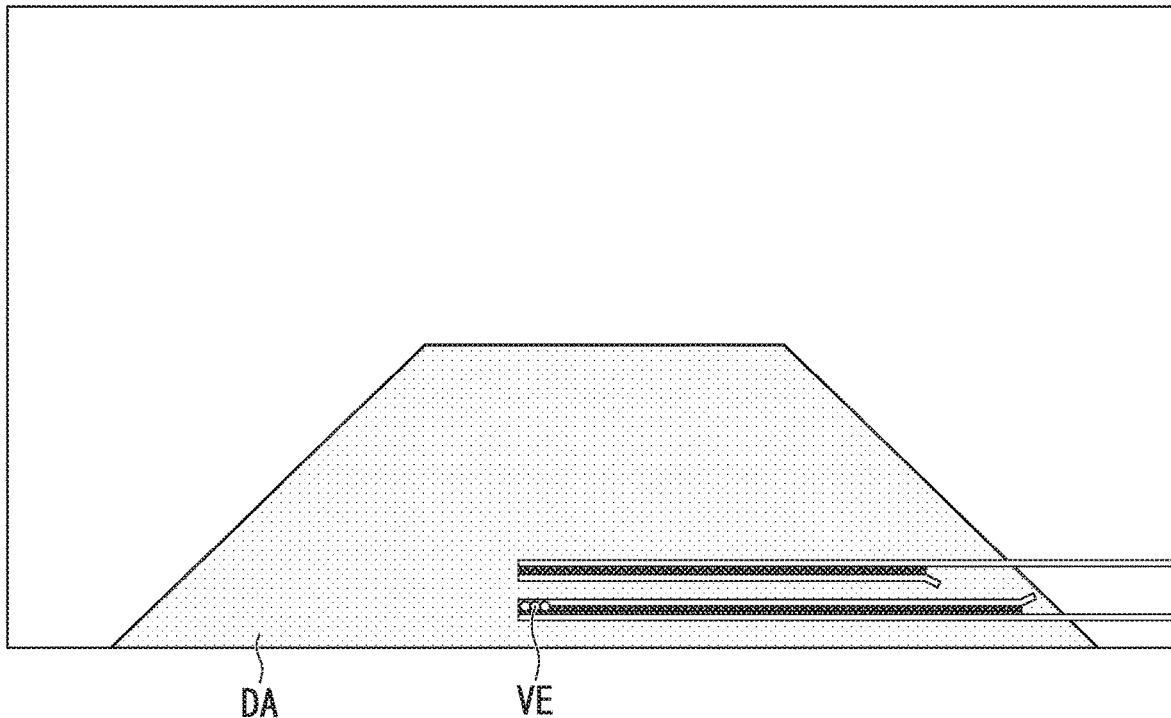
FIG. 12 is a diagram illustrating a scanning area and a vertical edge.

FIG. 12 is a diagram illustrating a scanning area DA and a vertical edge VE. The scanning area DA, for example, is an area acquired by setting a width to have a certain degree of room from left and right ends of the subject vehicle M in the widthwise direction and converting an area on an absolute plane having up to a predetermined distance on a side in the advancement direction from the subject vehicle M as its depth direction into an image plane. The scanning area DA has an approximately trapezoidal shape on the image plane. The vertical edge VE, for example, is a pixel of which an illuminance difference from that of an adjacent pixel is a threshold Th6 or more in the vertical direction in the image. The vertical edge VE is not limited thereto but may be extracted in accordance with any other rule as long as an equivalent property is maintained. Generally, illuminance values of pixels acquired by imaging a concave part C are significantly lower than those of surrounding pixels, and accordingly, there is a high probability of appearance of a vertical edge VE at a boundary between a concave part C and a road surface.

Figure 13:
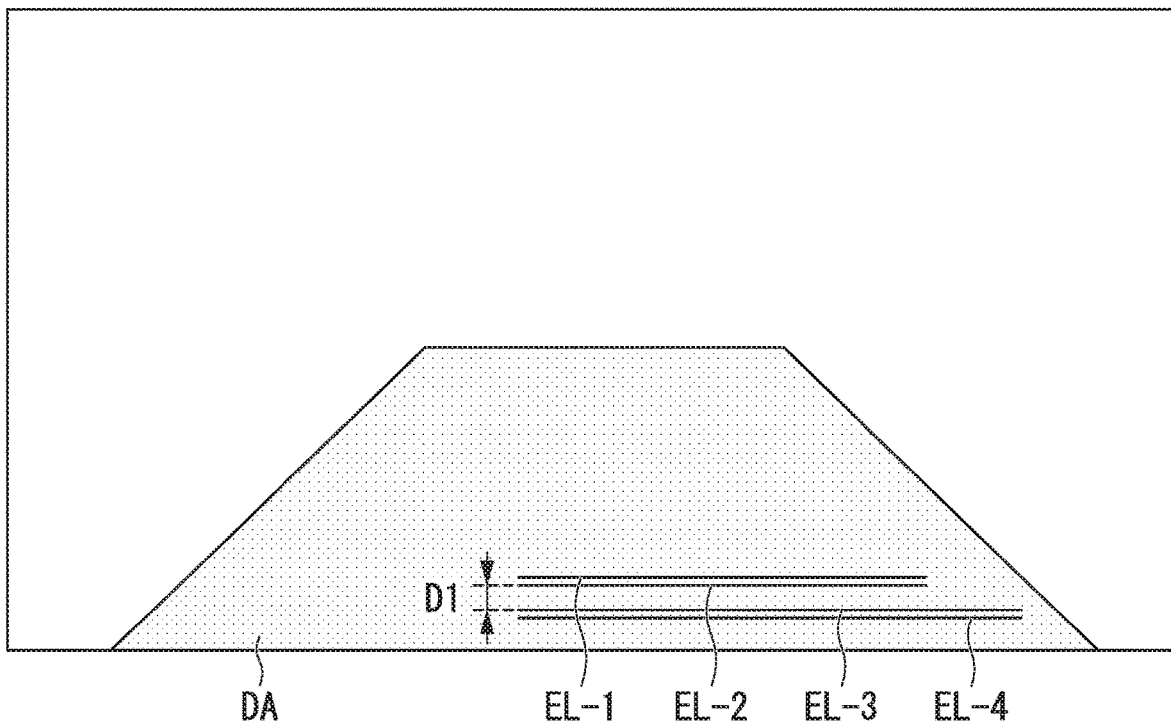
FIG. 13 is a diagram illustrating specified segments.

Referring back to FIG. 11, the concave part determiner 136 selects vertical edges VE aligned in an approximately horizontal direction and specifies a segment acquired by connecting the vertical edges (Step S214). Here, an approximately horizontal direction, for example, represents a direction being within about +20 to −20 degrees with respect to the horizontal direction of an image as its center. The concave part determiner 136, for example, sets a scanning line (not illustrated in the drawing) with the inclination changed inside the scanning area DA and specifies a scanning line at which a predetermined number of vertical edges VE or more vertical edges VE overlap each other. Then, a segment having vertical edges VE at both ends of the specified scanning line as its both ends is specified. Instead of this, a technique such as a least squares method or a Hough transform may be used for specifying a segment. FIG. 13 is a diagram illustrating specified segments EL-1 to EL-4. "D1" illustrated in the drawing will be described later.

Referring back to FIG. 11, the concave part determiner 136 extracts one set of segments that extend in parallel with a predetermined length or more and have widths within a predetermined range having a first predetermined width as its center among the segments specified in Step S204 and recognizes an area partitioned by such segments as a concave part C (Step S216). In FIG. 13, segments EL-1 and EL-2 or segments EL-3 and EL-4 correspond to one set of segments.

The process of Steps S212 to S216 is merely an example, and a process of "extracting an area acquired by collecting pixels of which the illuminance is equal to or less than a reference value as a concave part C" may be performed in a simpler manner using that the concave part C is reflected dark in an image. In addition to the process of Steps S212 to S216, "an average of illuminance of an area partitioned by one set of segments being equal to or less than a reference value" may be set as a condition for recognizing a concave part C.

Next, the concave part determiner 136 determines whether or not two or more concave parts C extending in parallel to each other are present (Step S230). In a case in which a determination result of "No" is acquired in Step S230, the concave part determiner 136 does not raise the degree of certainty in the presence of a crossing on the basis of the presence of a concave part C.

In a case in which determination of "Yes" is acquired in Step S230, the concave part determiner 136 selects arbitrary two concave parts among two or more concave parts C extending in parallel to each other and determines whether or not a gap between the two concave parts C is within a predetermined range having the second predetermined width as its center (Step S232). A gap D1 of two concave parts C is illustrated in FIG. 13. In a case in which determination of "No" is acquired in Step S232, the concave part determiner 136 does not raise the degree of certainty in the presence of a crossing on the basis of the presence of the concave part C.

On the other hand, in a case in which determination of "Yes" is acquired in Step S232, the concave part determiner 136 raises the degree of certainty in the presence of a crossing (Step S234).

In the process of the flowchart of FIG. 11, the predetermined length and the first predetermined width in Step S216 and the second predetermined width in Step S232 may be changed in accordance with a distance to the subject vehicle M, in other words, a position in the vertical direction in the image. When a position in the vertical direction in the image is positioned on a further lower side, the predetermined length, the first predetermined width, and the second predetermined width may be set to be larger, or, when a position in the vertical direction in the image is positioned on a further upper side, the predetermined length, the first predetermined width, and the second predetermined width may be set to be larger The process illustrated in the flowchart of FIG. 11 is merely one example, and the determination condition for proceeding to Step S234 may be alleviated, or the determination condition may be more restricted. For example, the concave part determiner 136 may assign a score to each segment in accordance with a length of the segment and not raise the degree of certainty in the presence of a crossing in a case in which only segments having low scores are present.

While the description presented above corresponds to a case in which a concave part C is formed between the track R and the guard rail GR, for a crossing having a structure in which concave parts C are present on both sides of the track R, there are cases in which two concave parts C are recognized for one track R. For this, two concave parts C extending in parallel to each other with a width corresponding to a track width may be recognized as a set of concave parts C, and the process of Step S230 and subsequent steps may be performed.

The concave part determiner 136 may further raise the degree of certainty in the presence of a crossing on the basis of a detection result acquired by the finder 14. The reflectivity of light for a track R is higher than that of surrounding objects, and thus, by referring to the detection result acquired by the finder 14, the presence/absence of a track R (or a guard rail GR; hereinafter, the same) and a position thereof can be derived. In such a case, for example, by referring to a detection result acquired by the finder 14, the concave part determiner 136 may determine that the one set of segments is sufficiently certain in a case in which the presence of a track R is recognized at a position corresponding to the concave part C in the flowchart of FIG. 11 and may discard the one set of segments in a case in which the presence of a track R is not recognized. In a case in which the accuracy of image recognition decreases at a night time or the like, the degree of certainty in the presence of a crossing may be raised on the basis of only the detection result acquired by the finder 14.

Figure 14:
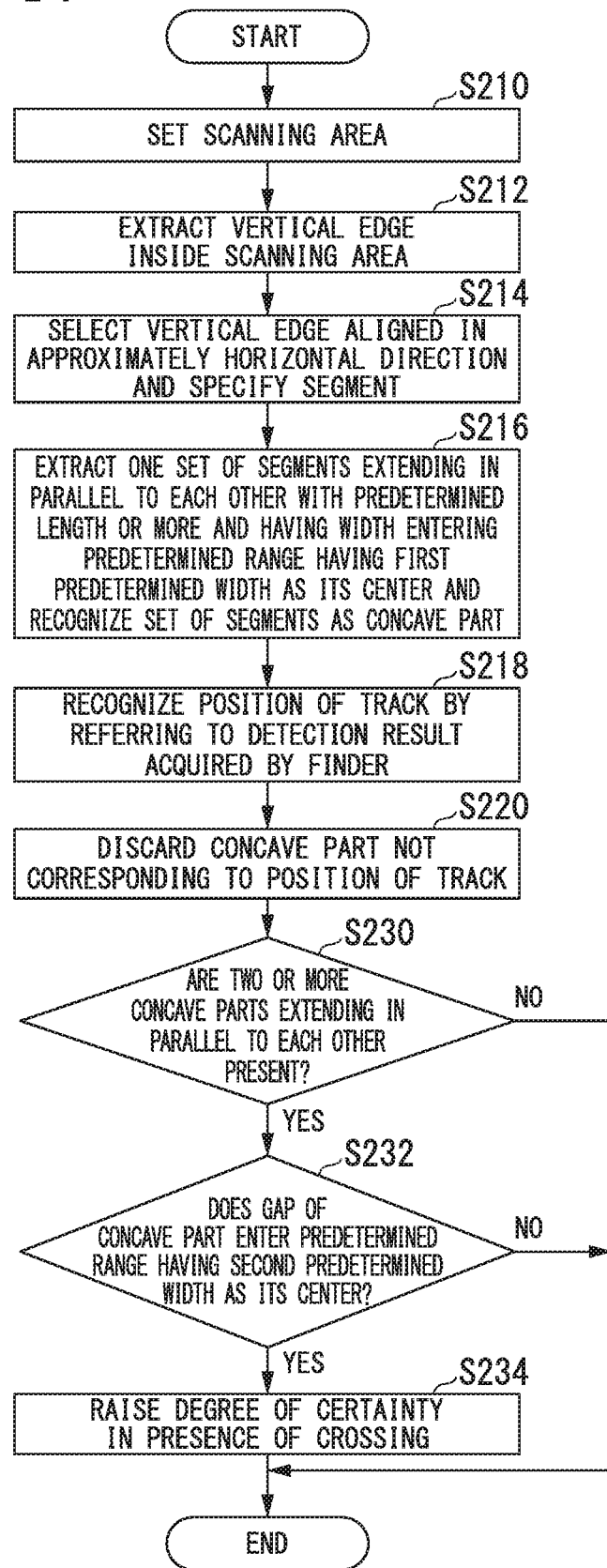
FIG. 14 is a flowchart (2) illustrating one example of details of a process executed by a concave part determiner.

FIG. 14 is a flowchart (2) illustrating one example of details of a process executed by the concave part determiner 136. The process of Steps S210 to S216 is similar to the process illustrated in the flowchart of FIG. 11, and thus, description thereof will not be presented here.

After recognizing a concave part C, the concave part determiner 136 recognizes the position of a track R by referring to a detection result acquired by the finder 14 (Step S218). Then, the concave part determiner 136 discards concave parts C not corresponding to the position of the track R recognized in Step S216 (Step S220). Here, "corresponding to the position of the track R" represents being present near a position acquired by projecting the absolute position of the track R onto an image plane. Hereinafter, the concave part determiner 136 executes the process of Step S230 and subsequent steps. This process is similar to the process illustrated in the flowchart of FIG. 11, and thus, description thereof will not be presented here.

Figure 15:
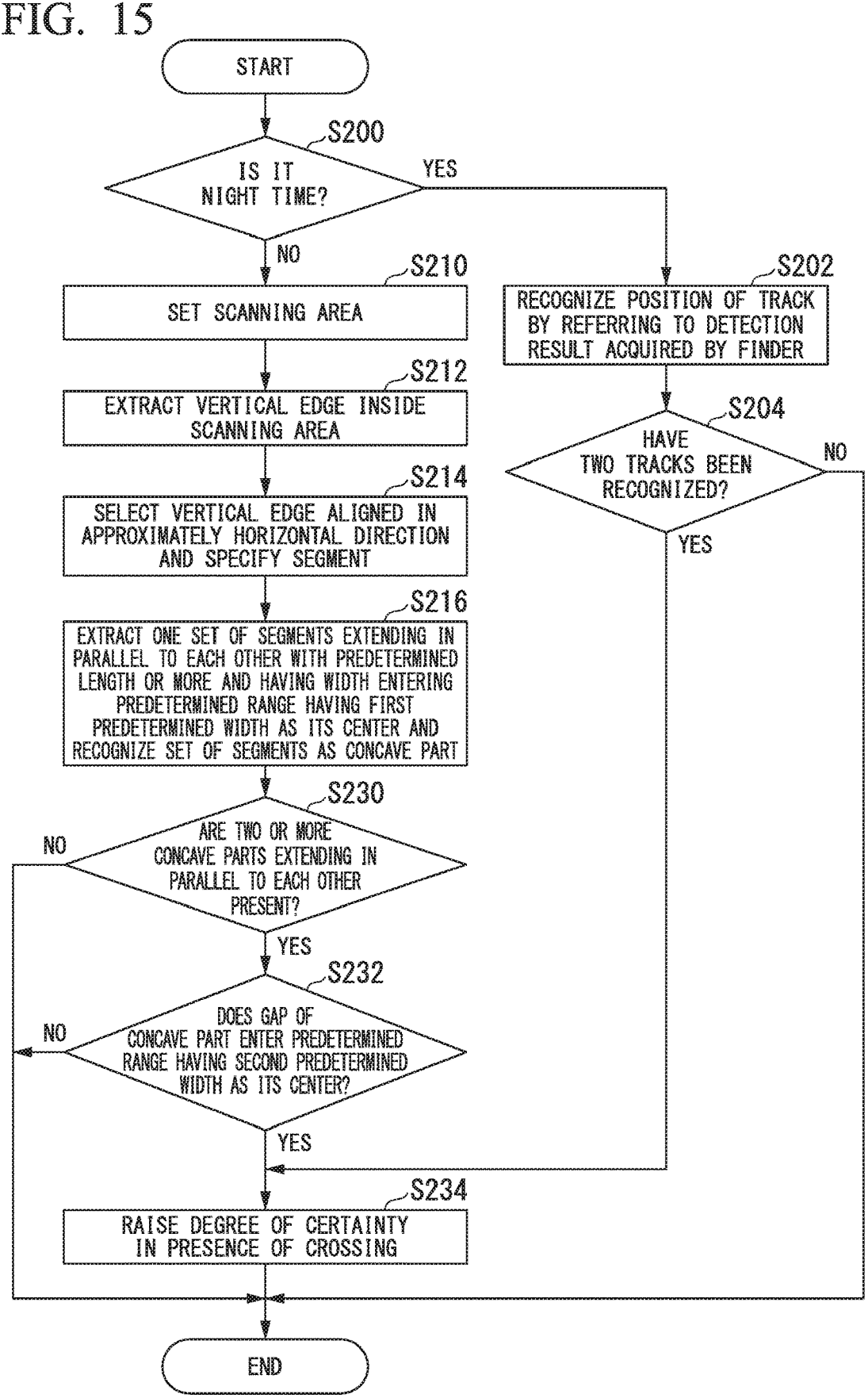
FIG. 15 is a flowchart (3) illustrating one example of details of a process executed by a concave part determiner.

FIG. 15 is a flowchart (3) illustrating one example of details of a process executed by the concave part determiner 136. First, the concave part determiner 136 determines whether or not the determination time point is a night time (Step S200). For example, in a case in which illuminance detected by the illuminance sensor included in the vehicle sensor 40 is less than the threshold Th1, the concave part determiner 136 determines that it is a night time. Instead of this, the concave part determiner 136 may determine whether or not it is a night time on the basis of time measured by a clock held inside. In the latter case, a determination criterion may be changed with the season taken into account. In a case in which it is determined that it is not a night time, the concave part determiner 136 executes the process of Step S210 and subsequent steps. This process is similar to the process of the flowchart of FIG. 11, and description thereof will not be presented here.

In a case in which it is determined that it is a night time, the concave part determiner 136 recognizes the position of the track R by referring to a detection result acquired by the finder 14 (Step S202). Then, the concave part determiner 136 determines whether or not at least two tracks R are recognized (Step S204). In a case in which at least two tracks R are recognized, the concave part determiner 136 raises the degree of certainty in the presence of a crossing (Step S224). On the other hand, in a case in which at least two tracks R are not recognized, the concave part determiner 136 does not raise the degree of certainty in the presence of a crossing. In a case in which a track R and a guard rail GR are recognized differently, the process of Step S204 may be "a process of determining whether or not at least four tracks R or guard rails GR are recognized" or may recognize a track R and a guard rail GR virtually as one track R due to close positions of the track R and the guard rail GR.

[Summary of Recognition of Crossing]

The crossing recognizer 132, for example, determines the presence of a crossing by integrating a result of the process using the color base determiner 134 and a result of the process using the concave part determiner 136. For example, in a case in which the degree of certainty has been further raised by any one of the color base determiner 134 and the concave part determiner 136, the crossing recognizer 132 causes the action plan generator 150 to start crossing passage control. For example, in a case in which the degree of certainty has been further raised by both the color base determiner 134 and the concave part determiner 136, the crossing recognizer 132 may cause the action plan generator 150 to start crossing passage control. The crossing recognizer 132 may have a configuration in which any one of the color base determiner 134 and the concave part determiner 136 is omitted. The image processing function of the crossing recognizer 132 may be realized by the object recognizing device 16.

[Crossing Passage Control]

Hereinafter, the crossing passage control executed by the crossing passage controller 152 of the action plan generator 150 will be described. The crossing passage controller 152 performs a process in cooperation with the prior-crossing passage status recognizer 140 of the recognizer 130. As illustrated in FIG. 2, the prior-crossing passage status recognizer 140, for example, includes an inside-crossing runnable area recognizer 142, an object determiner 144, and a train approach determiner 146. The crossing passage controller 152 includes a virtual lane setting unit 154.

(Virtual Lane Setting)

When the crossing passage control is started, the crossing passage controller 152 instructs the prior-crossing passage status recognizer 140 to start an operation. In accordance with this, the inside-crossing runnable area recognizer 142 of the prior-crossing passage status recognizer 140 recognizes an area inside a crossing in which the subject vehicle M can run, for example, on the basis of outputs of some or all of the camera 10, the finder 14, and the object recognizing device 16.

Figure 16:
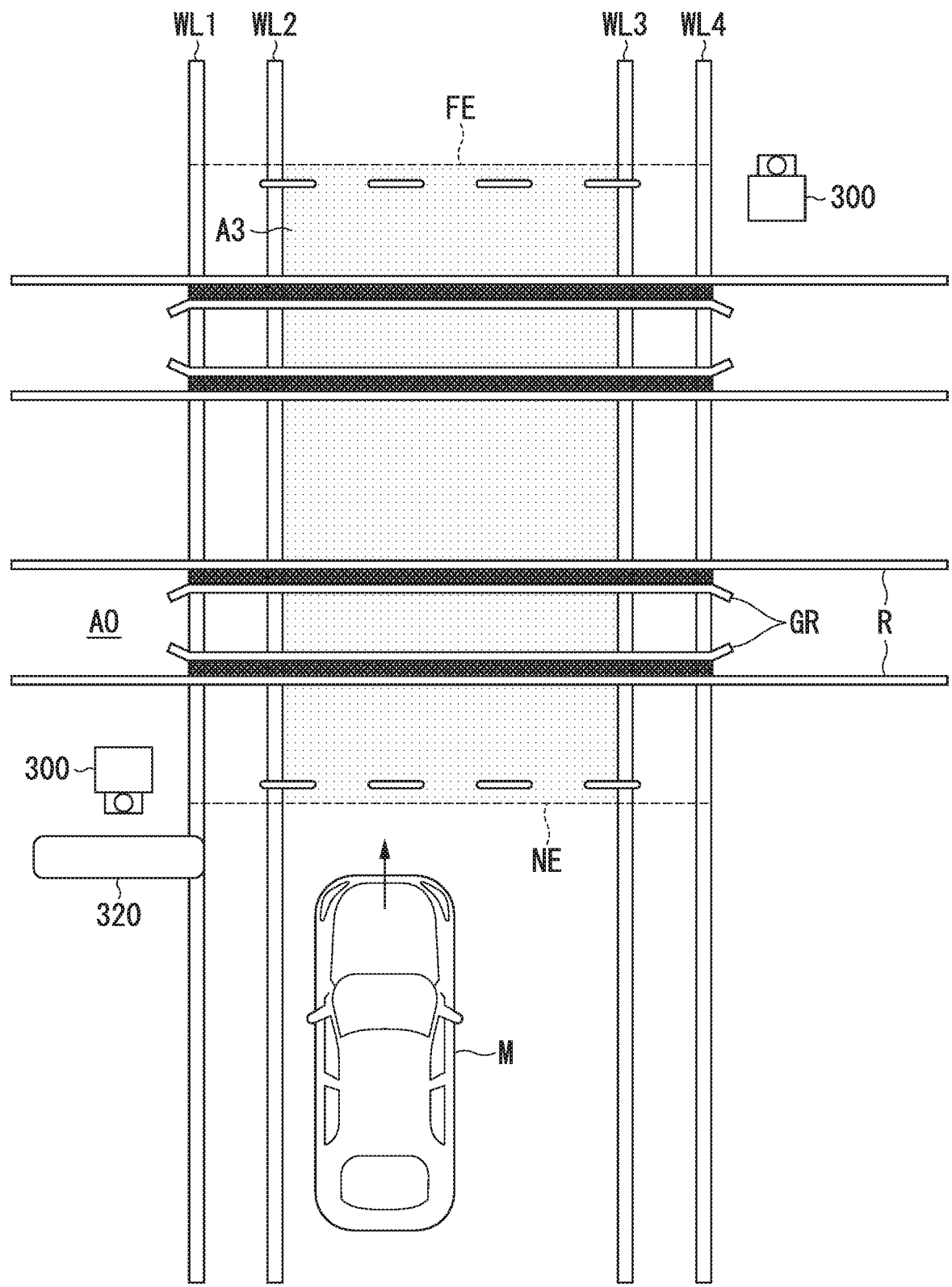
FIG. 16 is a diagram (1) illustrating an inside-crossing runnable area.

FIG. 16 is a diagram (1) illustrating an inside-crossing runnable area A3. This diagram illustrates a plane view of a crossing seen from the sky. The inside-crossing runnable area recognizer 142, for example, converts an image captured by the camera 10 into data on an absolute plane as illustrated in FIG. 16 and performs the process. In this crossing, pedestrian roads are defined by partition lines WL1 and WL2 and partition lines WL3 and WL4 drawn using white lines, yellow lines, and the like, and a vehicle road is defined by the partition line WL2 and the partition line WL3. In a crossing having a such a form, for example, the inside-crossing runnable area recognizer 142 recognizes an area partitioned by the partition lines WL2 and WL3 and virtual lines NE and FE acquired by projecting the positions of a crossbar when the crossbar of a crossing gate 300 is lowered onto the road surface (here, a road material is frequently changed, and thus, a change in the road material may be recognized) as an inside-crossing runnable area A3. The inside-crossing runnable area recognizer 142 may recognize an area defined as a pedestrian road as a preliminary area.

Figure 17:
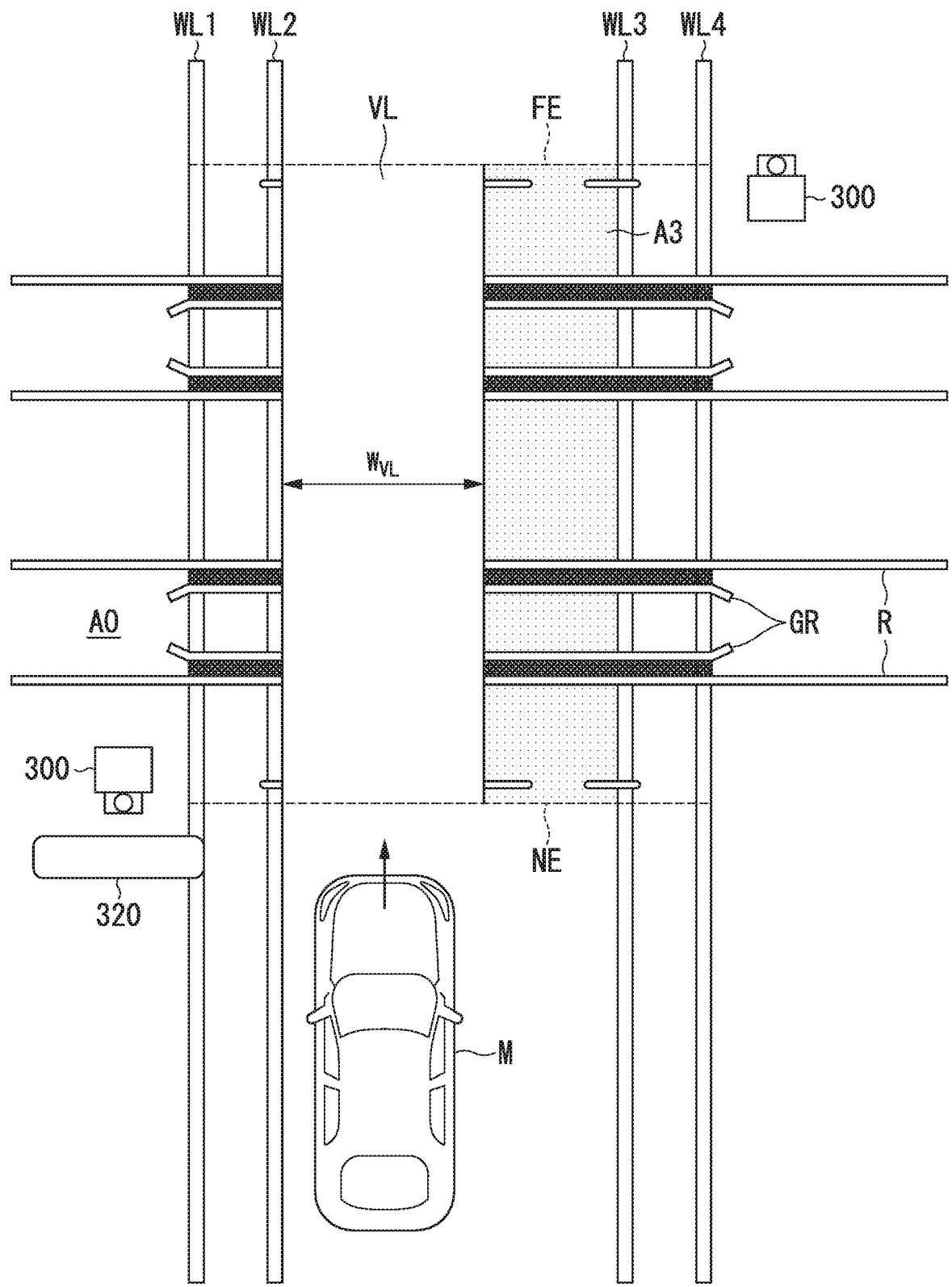
FIG. 17 is a diagram illustrating a view in which a virtual lane is set in the crossing illustrated in FIG. 16.

The virtual lane setting unit 154 of the crossing passage controller 152 sets a virtual lane VL inside the inside-crossing runnable area A3 in which the subject vehicle M runs. FIG. 17 is a diagram illustrating a view in which a virtual lane VL is set in the crossing illustrated in FIG. 16. As illustrated in the drawing, the virtual lane setting unit 154, for example, sets an area having a right end of the partition line WL2 as its left end and having a width $W_{VL}$ acquired by adding a margin length to the vehicle width of the subject vehicle M as a virtual lane VL.

When the virtual lane VL is set, the crossing passage controller 152 instructs the object determiner 144 to determine whether or not an object is present on the virtual lane VL. The object determiner 144 determines whether or not an object is present on the virtual lane VL on the basis of outputs of some or all of the camera 10, the finder 14, and the object recognizing device 16.

At this time, the object determiner 144 may compare the width of the inside-crossing runnable area A3 with the width of the virtual lane VL and determine all the objects present in the inside-crossing runnable area A3 as objects present on the virtual lane VL in a case in which only one virtual lane VL can be set in the inside-crossing runnable area A3 (in a case in which the width of the inside-crossing runnable area A3 is less than twice the width of the virtual lane VL). At this time, the object determiner 144 may exclude a vehicle running in the same direction as that of the subject vehicle M.

Figure 18:
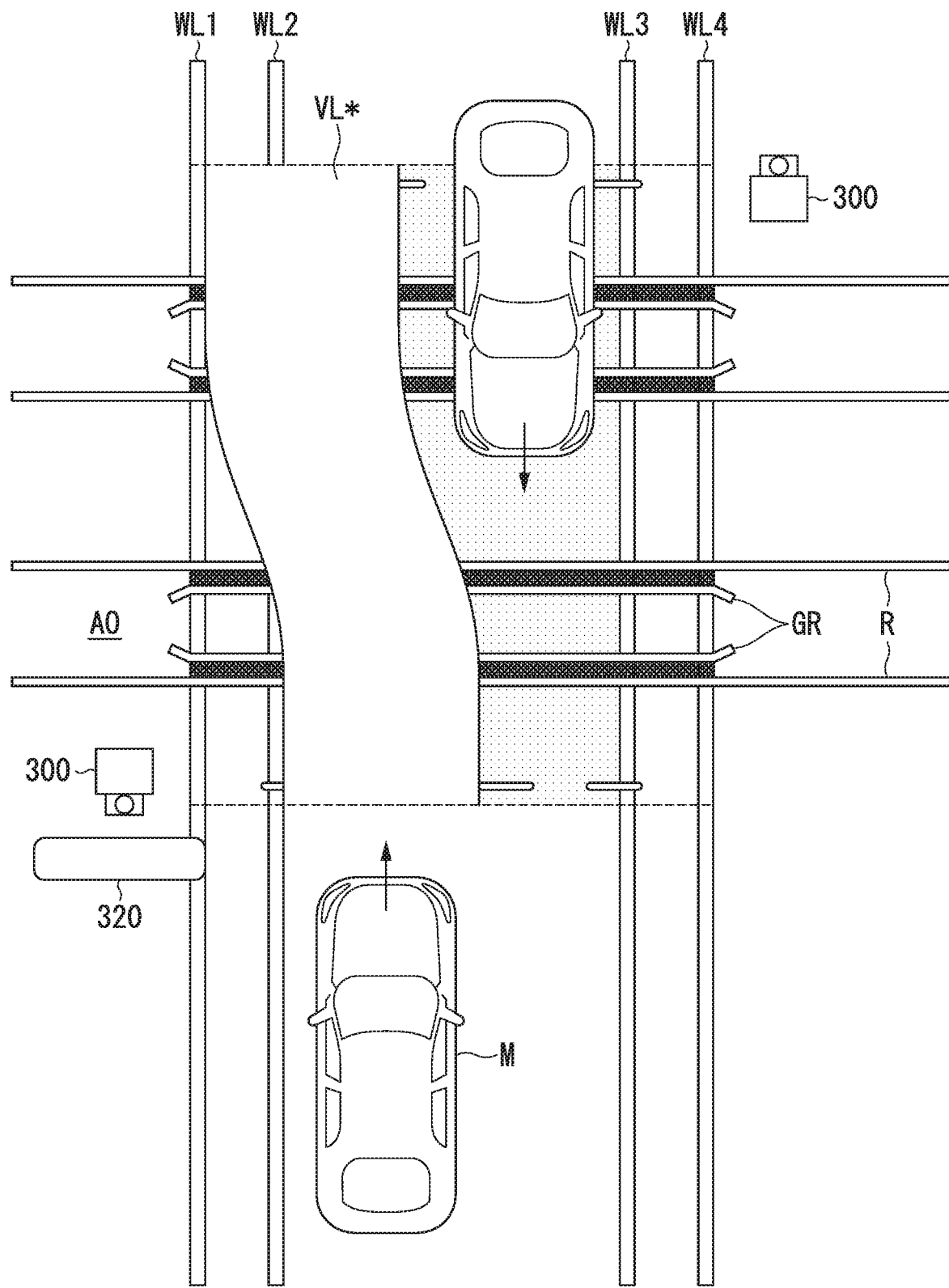
FIG. 18 is a diagram illustrating a re-set virtual lane.

In a case in which it is determined by the object determiner 144 that an object is present on the virtual lane VL, the virtual lane setting unit 154 may re-set the virtual lane VL when a virtual lane VL that can avoid the object can be re-set. FIG. 18 is a diagram illustrating a re-set virtual lane VL*. The virtual lane setting unit 154, for example, after checking that a pedestrian or any other object is not present in the preliminary area (in the drawing, an area interposed between the partition lines WL1 and WL2) described above, may set the virtual lane VL* using the preliminary area.

Figure 19:
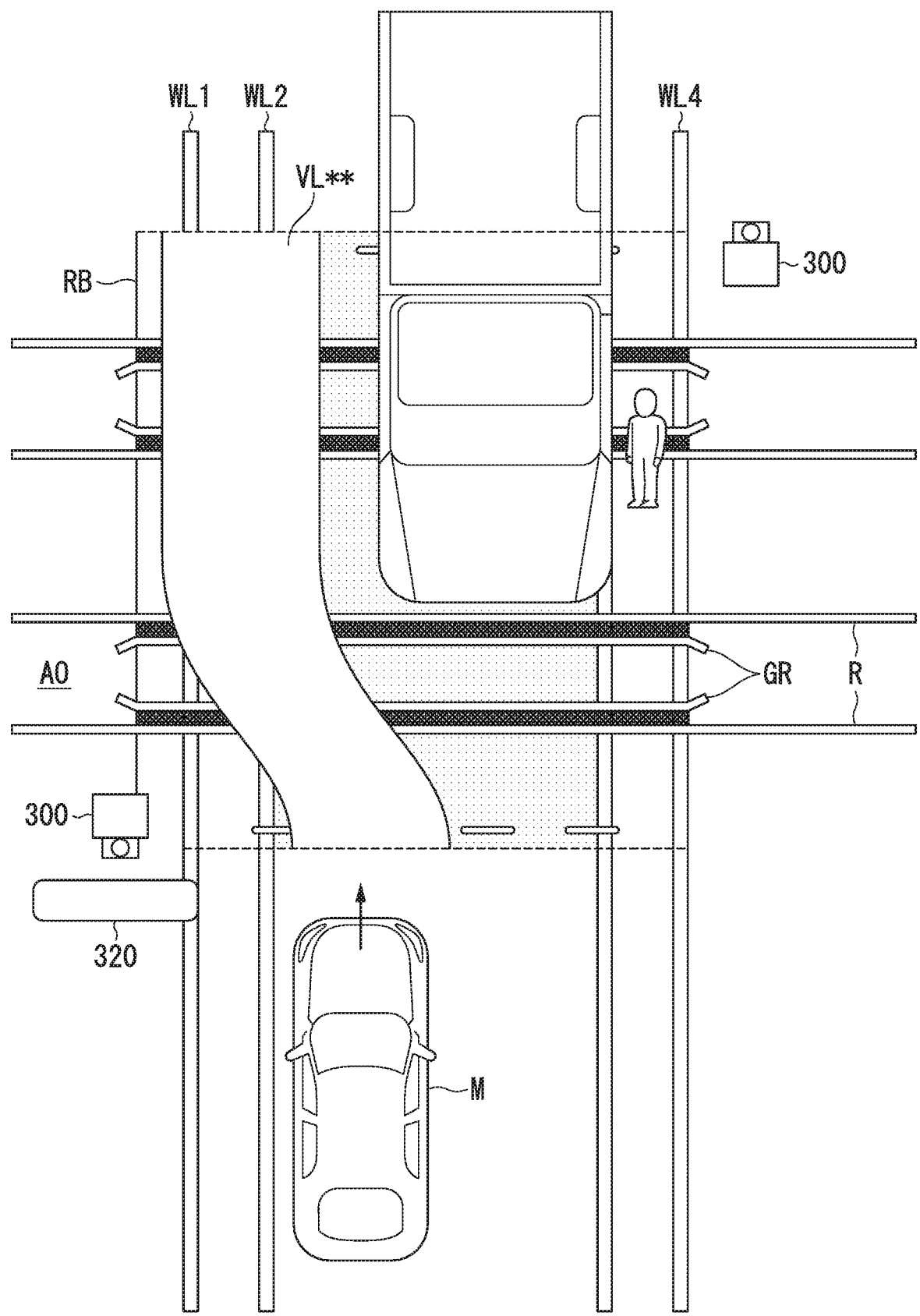
FIG. 19 is a diagram illustrating a re-set virtual lane.

In a case in which a runnable area is present on the left side of the partition line WL1 (or the right side of the partition line WL4), the virtual lane setting unit 154 may re-set the virtual lane VL to include up to an area exceeding the partition line WL1. FIG. 19 is a diagram illustrating a re-set virtual lane VL. In the drawing, a running road boundary RB is illustrated and is an end portion of a structure formed to have the same height as that of at least a track R. In this way, the virtual lane setting unit 154 may re-set the virtual lane VL such that running up to the running road boundary RB can be performed. The running road boundary RB can be recognized by extracting horizontal edges in an image captured by the camera 10 and deriving a straight line or a curve in which the horizontal edges are aligned. A horizontal edge, for example, is a pixel having an illuminance difference of a threshold Th7 or more from an adjacent pixel in the horizontal direction in the image. This technique can be applied also to a case in which a partition line is not drawn at all inside a crossing.

Figure 20:
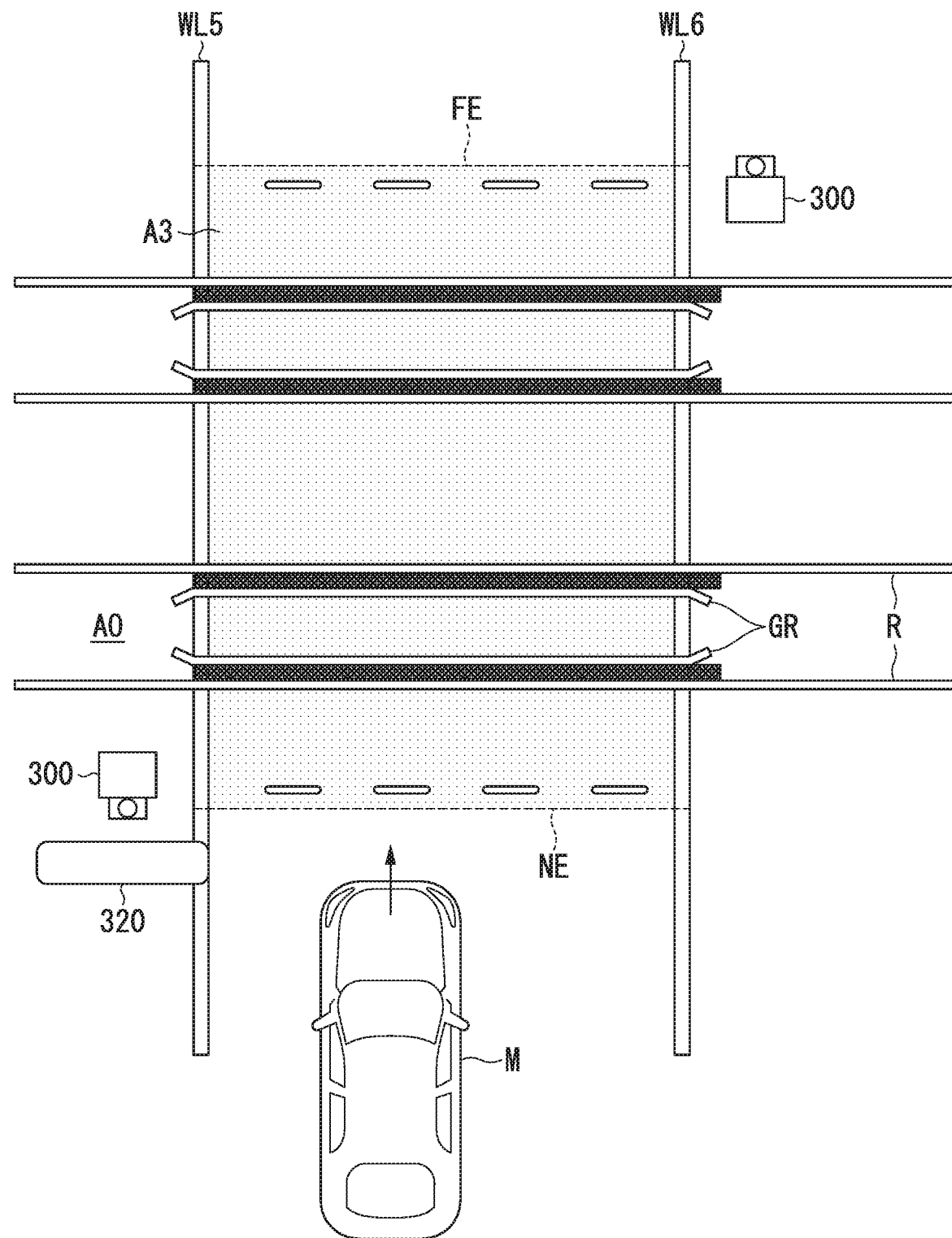
FIG. 20 is a diagram (2) illustrating the inside-crossing runnable area.

FIG. 20 is a diagram (2) illustrating the inside-crossing runnable area A3. A crossing illustrated in the drawing is a crossing in which a pedestrian road does not appear on the road surface, and only one pair of partition lines WL5 and WL6 are drawn. In this case, the inside-crossing runnable area recognizer 142, for example, recognizes an area partitioned by partition lines WL5 and WL6 and the virtual lines NE and FE described above as the inside-crossing runnable area A3.

Figure 21:
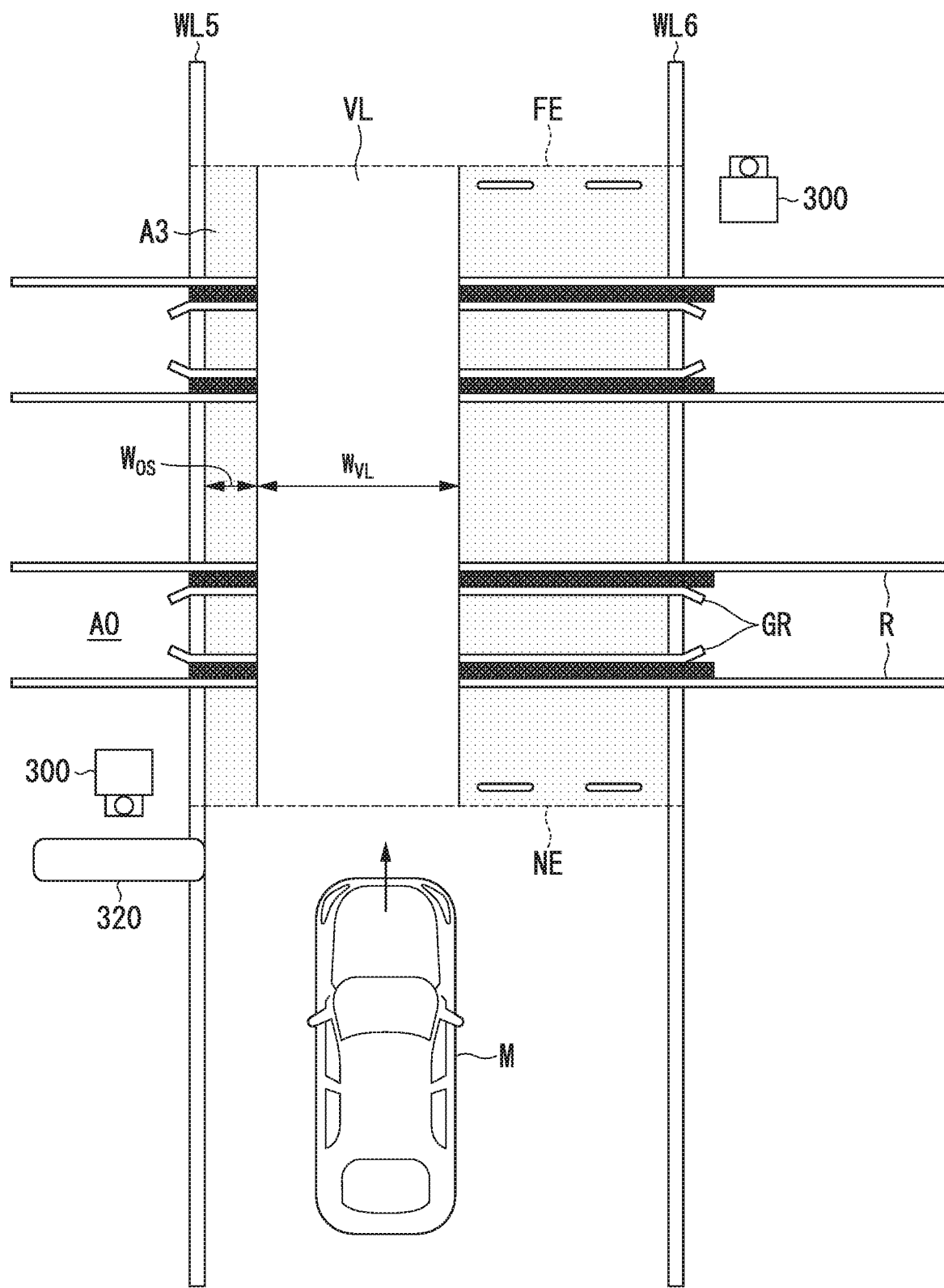
FIG. 21 is a diagram illustrating a view in which a virtual lane is set in the crossing illustrated in FIG. 20.

FIG. 21 is a diagram illustrating a view in which a virtual lane VL is set in the crossing illustrated in FIG. 20. As illustrated in the drawing, the virtual lane setting unit 154, for example, sets an area having a position away from a right end of the partition line WL5 by a predetermined width $W_{OS}$ as its left end and having a width $W_{VL}$ acquired by adding a margin length to the vehicle width of the subject vehicle M as a virtual lane VL. The predetermined width $W_{OS}$, for example, is a width of a degree enabling one pedestrian to pass it through. The virtual lane setting unit 154 may increase the predetermined width $W_{OS}$ as the width of the inside-crossing runnable area A3 becomes larger.

In a crossing as illustrated in FIG. 20, in a case in which it is determined by the object determiner 144 that an object is present on the virtual lane VL, the virtual lane setting unit 154 re-sets the virtual lane VL in the inside-crossing runnable area A3 when a virtual lane VL that can avoid the object can be re-set. In a case in which a runnable area is present on the left side of the partition line WL5 (or the right side of the partition line WL6), the virtual lane setting unit 154 may re-set the virtual lane VL to include up to an area exceeding the partition line WL5.

Figure 22:
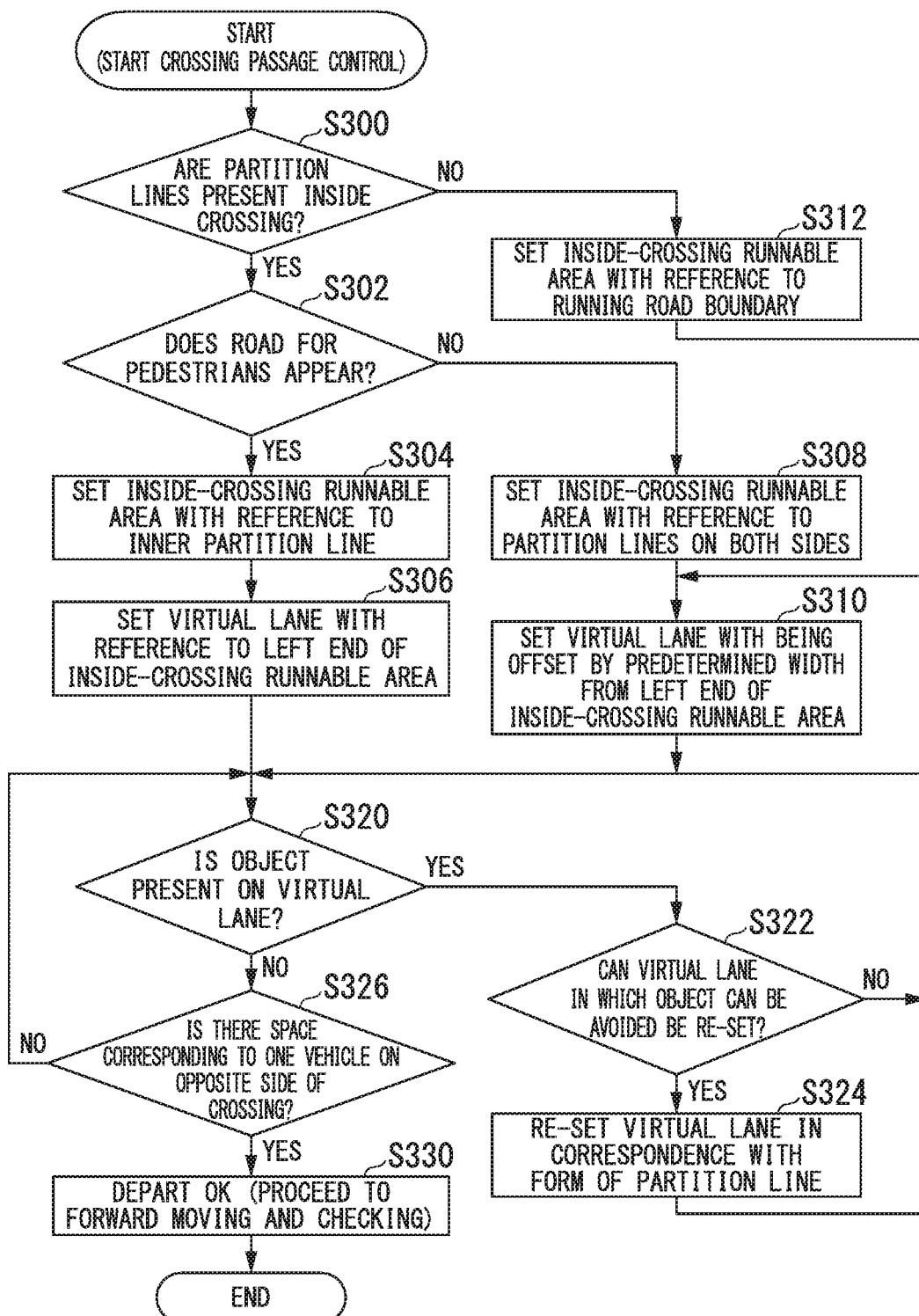
FIG. 22 is a flowchart illustrating one example of the flow of a process executed using a crossing passage controller and a prior-crossing passage status recognizer.

FIG. 22 is a flowchart illustrating one example of the flow of a process executed using the crossing passage controller 152 and the prior-crossing passage status recognizer 140. First, the inside-crossing runnable area recognizer 142 of the prior-crossing passage status recognizer 140 analyzes the image captured by the camera 10 and determines whether or not partition lines are present inside the crossing (Step S300). In a case in which it is determined that partition lines are present inside the crossing, the inside-crossing runnable area recognizer 142 determines whether or not a road for pedestrians is illustrated using the partition lines (Step S302).

In a case in which a road for pedestrians appears using partition lines, the inside-crossing runnable area recognizer 142 sets an inside-crossing runnable area A3 with reference to an inner partition line (for example, a partition line WL2 illustrated in FIG. 16) (Step S304). In such a case, the virtual lane setting unit 154 sets a virtual lane VL with reference to a left end of the inside-crossing runnable area A3 (Step S306).

On the other hand, in a case in which a road for pedestrians does not appear using partition lines, the inside-crossing runnable area recognizer 142 sets an inside-crossing runnable area A3 with reference to partition lines on both sides (for example, partition lines WL5 and WL6 illustrated in FIG. 20) (Step S308). In this case, the virtual lane setting unit 154 sets a virtual lane VL with being offset by a predetermined $W_{OS}$ from the left end of the inside-crossing runnable area A3 (Step S310).

Figure 23:
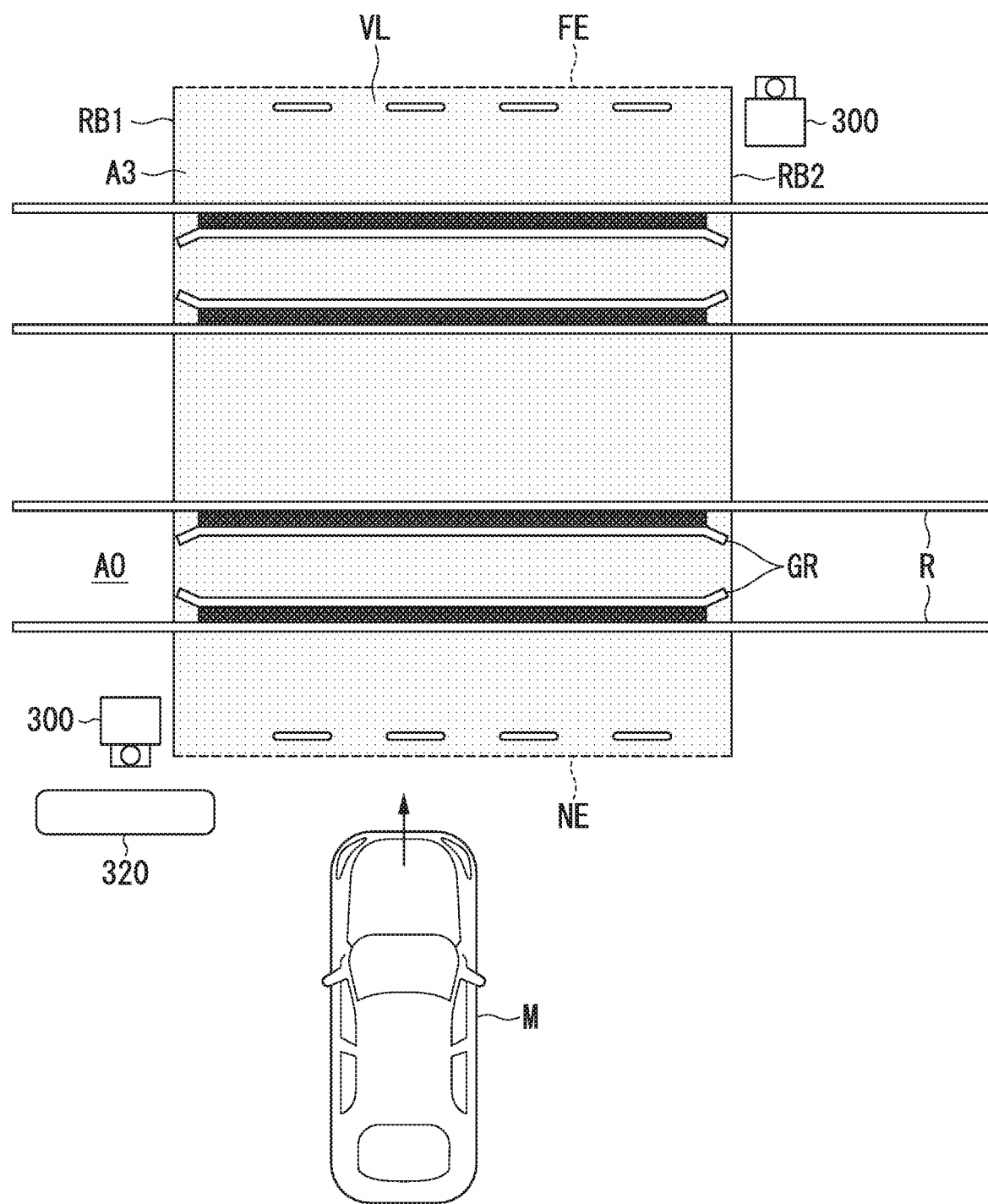
FIG. 23 is a diagram illustrating a view in which an inside-crossing runnable area is set with reference to running road boundaries.

In a case in which partition lines are not present inside the crossing, the inside-crossing runnable area recognizer 142 sets an inside-crossing runnable area A3 with reference to a running road boundary (for example, the running road boundary RB illustrated in FIG. 19) and a running road boundary disposed on the opposite side (Step S312). FIG. 23 is a diagram illustrating a view in which an inside-crossing runnable area A3 is set with reference to running road boundaries RB1 and RB2. The running road boundaries RB1 and RB2 can be respectively recognized by extracting horizontal edges from the image captured by the camera 10 and deriving straight lines or curves in which the horizontal edges are aligned. In this case, the virtual lane setting unit 154 sets a virtual lane VL with being offset by a predetermined width $W_{OS}$ from the left end of the inside-crossing runnable area A3 (Step S310).

Referring back to FIG. 22, when the virtual lane VL is set, the object determiner 144 determines whether or not an object is present on the virtual lane VL (Step S320). In a case in which it is determined that an object is present on the virtual lane VL, the virtual lane setting unit 154 determines whether or not a lane in which an object can be avoided can be re-set (Step S322). In a case in which it is determined that the re-setting can be performed, the virtual lane setting unit 154 re-sets a virtual lane VL in accordance with forms of partition lines of which kinds are determined in Steps S300 and S302 (Step S324; FIGS. 18 and 19). After determination of "No" is acquired in Step S322, and after re-setting of the virtual lane VL in Step S324, the process is returned to Step S320.

On the other hand, in a case in which it is determined that no object is present on the virtual lane VL, the crossing passage controller 152 determines whether or not there is a vacant area corresponding to one vehicle on the opposing side of the crossing (immediately after passing the crossing) by referring to outputs of the camera 10, the radar device 12, the finder 14, the object recognizing device 16, and the like (Step S326). In a case in which there is no vacant area corresponding to one vehicle on the opposite side of the crossing, the process is returned to Step S320. On the other hand, in a case in which there is a vacant area corresponding to one vehicle on the opposite side of the crossing, the crossing passage controller 152 determines that the subject vehicle may depart (Step S330). After execution of the process of Step S330, the crossing passage controller 152 may proceed to a stage of forward movement and checking as will be described later.

(Forward Movement and Checking)

Figure 24:
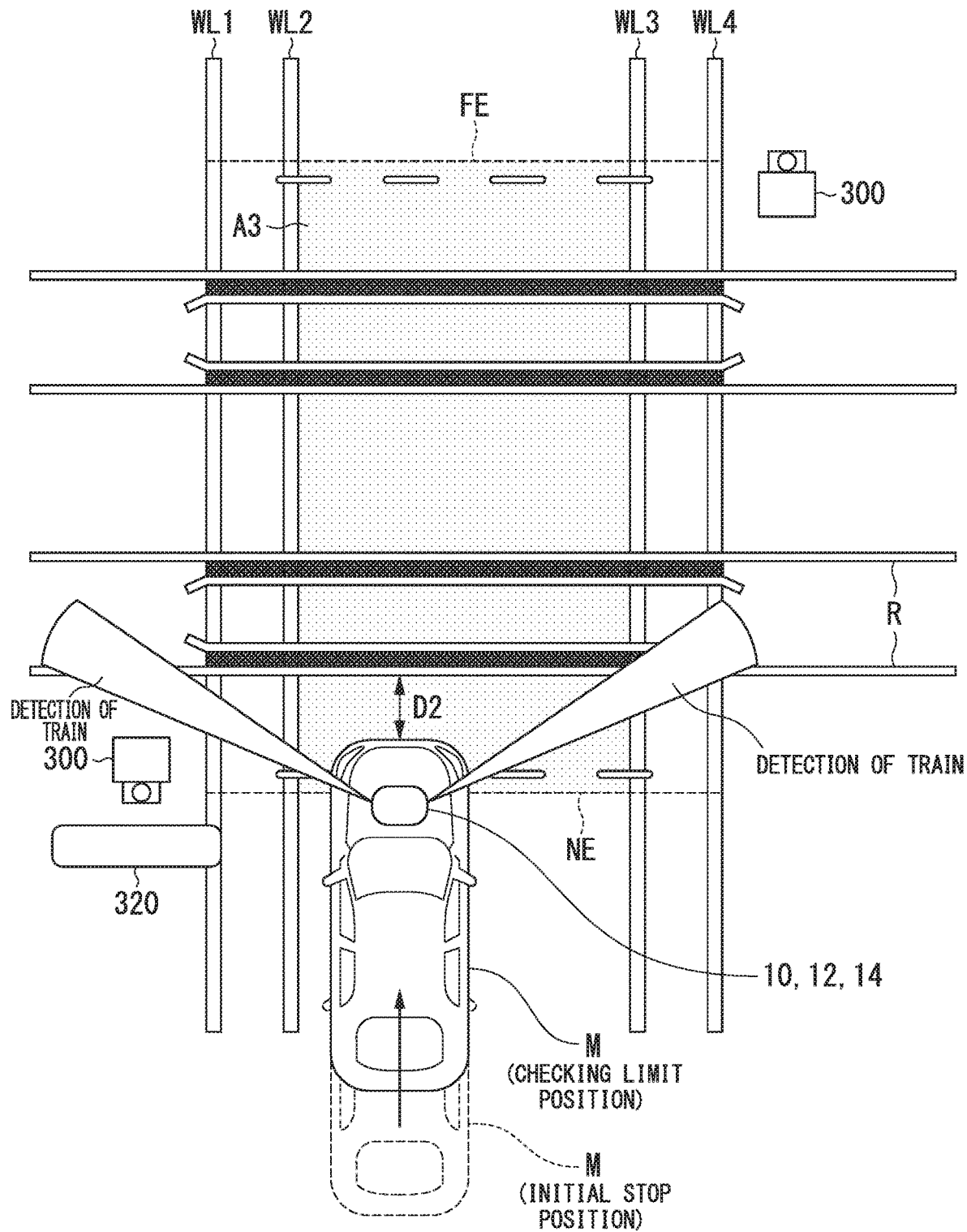
FIG. 24 is a diagram illustrating forward movement and checking.

When determination relating to the virtual lane VL is completed, the crossing passage controller 152 performs control for advancing and checking an approach of a train (hereinafter, referred to as forward movement and checking). FIG. 24 is a diagram illustrating the forward movement and checking For example, while the crossing recognizer 132 performs a recognition process, the crossing passage controller 152 stops the subject vehicle M at an initial stop position. The initial stop position is a position an arbitrary position at which a front end of the subject vehicle M is on a nearer side than the virtual line NE and is close to the virtual line NE such that there is no obstacle for a recognition process performed by the crossing recognizer 132.

After the subject vehicle M stops at an initial stop position, the crossing passage controller 152 causes the subject vehicle M to move forward with a checking limit position (one example of a predetermined position) as its limit. The speed of the subject vehicle M at this time, for example, is maintained at a low speed of about 10 to 20 [km/h]. The checking limit position is a position at which a train is not in contact with the subject vehicle M even when the train passes. For example, when a distance between a front end portion of the subject vehicle M and a track R disposed on the frontmost side when seen from the subject vehicle M reaches a predetermined distance D2, the crossing passage controller 152 determines arrival at the checking limit position. The crossing passage controller 152, for example, recognizes the position of the track R using information acquired in the process performed by the concave part determiner 136.

Before/after causing the subject vehicle M to move forward, the crossing passage controller 152 requests the train approach determiner 146 to determine an approach/no-approach of a train. While the subject vehicle M is moving forward or after the subject vehicle M stops at the checking limit position after forward movement, the train approach determiner 146 determines whether or not a train approaches the subject vehicle M with a predetermined degree or more by referring to detection results acquired by the detection devices such as the camera 10, the radar device 12, and the finder 14. Here, "approaching with a predetermined degree or more," for example, is when an index value acquired by dividing a distance between the subject vehicle M and a train by a speed of the train (a time until the arrival of the train) is a threshold Th8 or less.

In a case in which it is determined that the train has not approached the subject vehicle M with the predetermined degree or more by the train approach determiner 146, the crossing passage controller 152 causes the subject vehicle M to pass through the crossing. On the other hand, in a case in which it is determined that a train has approached the subject vehicle M with the predetermined degree or more by the train approach determiner 146, the crossing passage controller 152 causes the subject vehicle M to stop (a stop state is maintained in a case in which the subject vehicle has stopped) or move backward.

Figure 25:
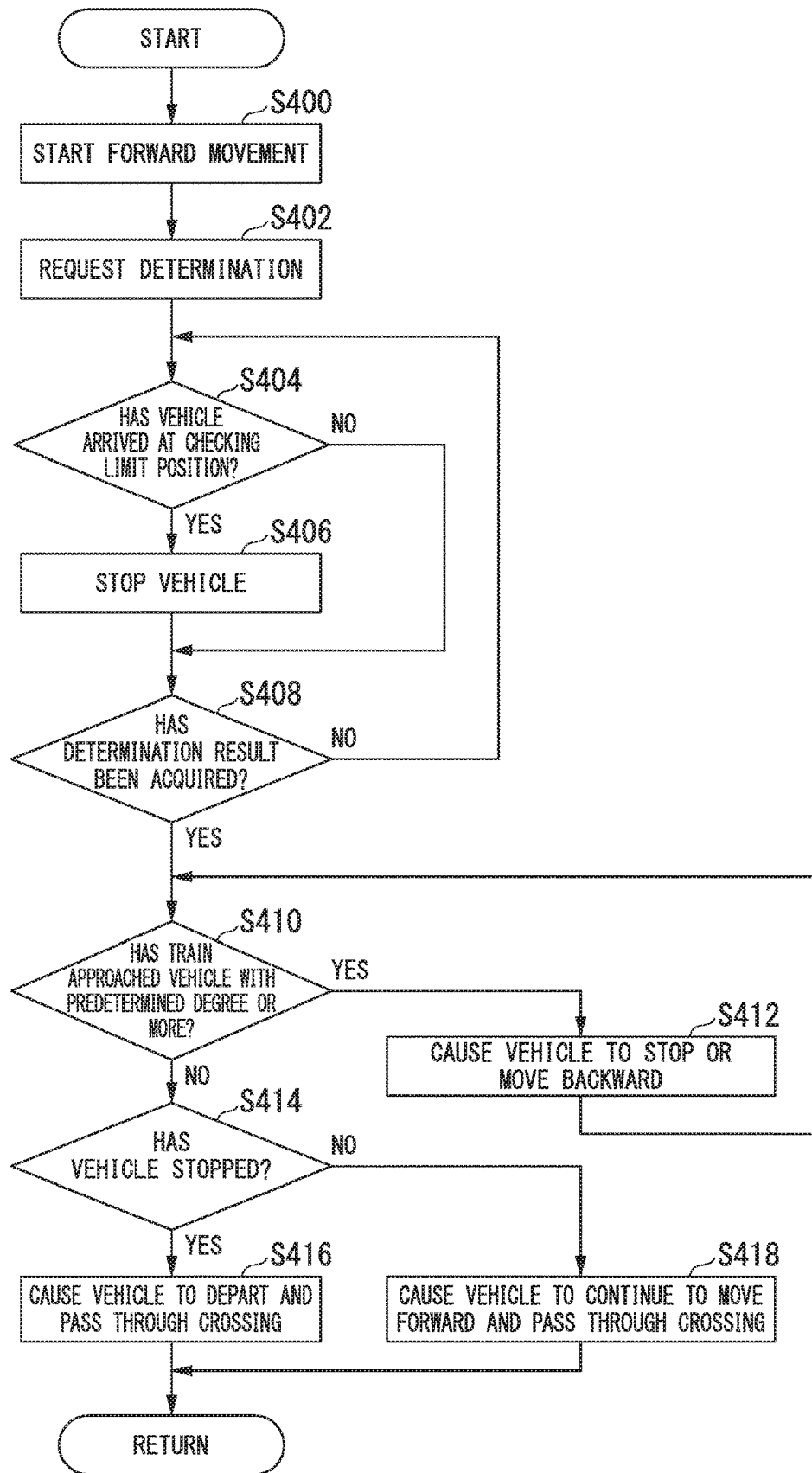
FIG. 25 is a flowchart illustrating one example of the flow of a process executed by a crossing passage controller and a train approach determiner.

FIG. 25 is a flowchart illustrating one example of the flow of a process executed by the crossing passage controller 152 and the train approach determiner 146. First, the crossing passage controller 152 causes the subject vehicle M to start forward movement (Step S400) and requests the train approach determiner 146 to perform determination (Step S402).

Next, the crossing passage controller 152 determines whether or not the subject vehicle M has arrived at the checking limit position (Step S404). In a case in which it is determined that the subject vehicle M has arrived at the checking limit position, the crossing passage controller 152 stops the subject vehicle M (Step S406).

Next, the crossing passage controller 152 determines whether or not a determination result using the train approach determiner 146 has been acquired (Step S408). In a case in which a determination result using the train approach determiner 146 has not been acquired, the process is returned to Step S404.

In a case in which a determination result using the train approach determiner 146 has been acquired, the crossing passage controller 152 determines whether or not the determination result represents an approach of a train with a predetermined degree or more (Step S410). In a case in which determination of "Yes" is acquired in Step S410, the crossing passage controller 152 causes the subject vehicle M to stop or move backward (Step S412). Then, the process is returned to Step S410.

On the other hand, in a case in which determination of "No" is acquired in Step S410, the crossing passage controller 152 determines whether or not the subject vehicle M has stopped (Step S414). In a case in which the subject vehicle M has stopped, the crossing passage controller 152 causes the subject vehicle M to depart and pass through the crossing (Step S416). On the other hand, in a case in which the subject vehicle M has not stopped, the crossing passage controller 152 causes to subject vehicle M to continue to move forward and pass through the crossing (Step S418). In any one of the cases of Steps S416 and S418, the crossing passage controller 152 generates a target trajectory of the subject vehicle M such that it runs on the virtual lane VL set (or re-set) by the virtual lane setting unit 154.

In a case in which a determination result indicating no approach of a train with the predetermined degree or more is acquired before the subject vehicle M arrives at the checking limit position in a relating process, the subject vehicle M can continue to move forward and quickly pass through the crossing without stopping at the checking limit position. On the other hand, in a case in which a determination result is not acquired before the subject vehicle M arrives at the checking limit position, the subject vehicle M can stop at the checking limit position and appropriately recognize an approach of a train. Instead of this, the subject vehicle M may be caused to move forward up to the checking limit position and essentially stop at the checking limit position. In such a case, in a state in which the subject vehicle stops at the checking limit position, the determination of an approach of a train may be performed.

According to the vehicle control device of the first embodiment described above, determination on the presence of a crossing is performed on the basis of elements of specific colors representing the presence of a crossing, which are included in an image captured by the camera 10, and accordingly, the degree of certainty in the presence of a crossing at a running destination of the subject vehicle M can be raised.

According to the vehicle control device of the first embodiment, in an advancement direction of the subject vehicle, detection devices (the camera 10 and the finder 14) used for detecting the presence of a concave part extending in a direction intersecting the advancement direction are included, and it is determined whether or not a concave part extending in a direction intersecting the advancement direction on the basis of outputs of the detection devices, and, in a case in which it is determined that the concave part is present, the presence of a crossing in the advancement direction of the subject vehicle M is recognized, whereby the degree of certainty in the presence of a crossing at a running destination of the subject vehicle M can be raised.

According to the vehicle control device of the first embodiment, the virtual lane setting unit 154 setting a virtual lane VL in an area inside a crossing present in the advancement direction of the subject vehicle M on the basis of a recognition result acquired by the recognizer 130 is included, and, the subject vehicle M is caused to run inside the virtual lane VL and pass through the crossing, whereby the subject vehicle M can be caused to run in an appropriate route inside the crossing.

According to the vehicle control device of the first embodiment, after the subject vehicle M is stopped in front of a crossing, the subject vehicle is caused to move forward, it is determined whether or not a train approaches the subject vehicle M with a predetermined degree or more by referring to detection results acquired by the object detecting units (the camera 10, the radar device 12, and the finder 14), and the subject vehicle M is caused to pass through the crossing in a case in which the train has not approached the subject vehicle with the predetermined degree or more, whereby the subject vehicle M can pass through the crossing more safely.

In the embodiment described above, although the crossing passage controller 152 starts the process in a case in which the degree of certainty in the presence of a crossing is raised by the crossing recognizer 132, the process may be started in a case in which the presence of a crossing in the advancement direction of the subject vehicle M is recognized by comparing the position information with the second map information 62.

Second Embodiment

Figure 26:
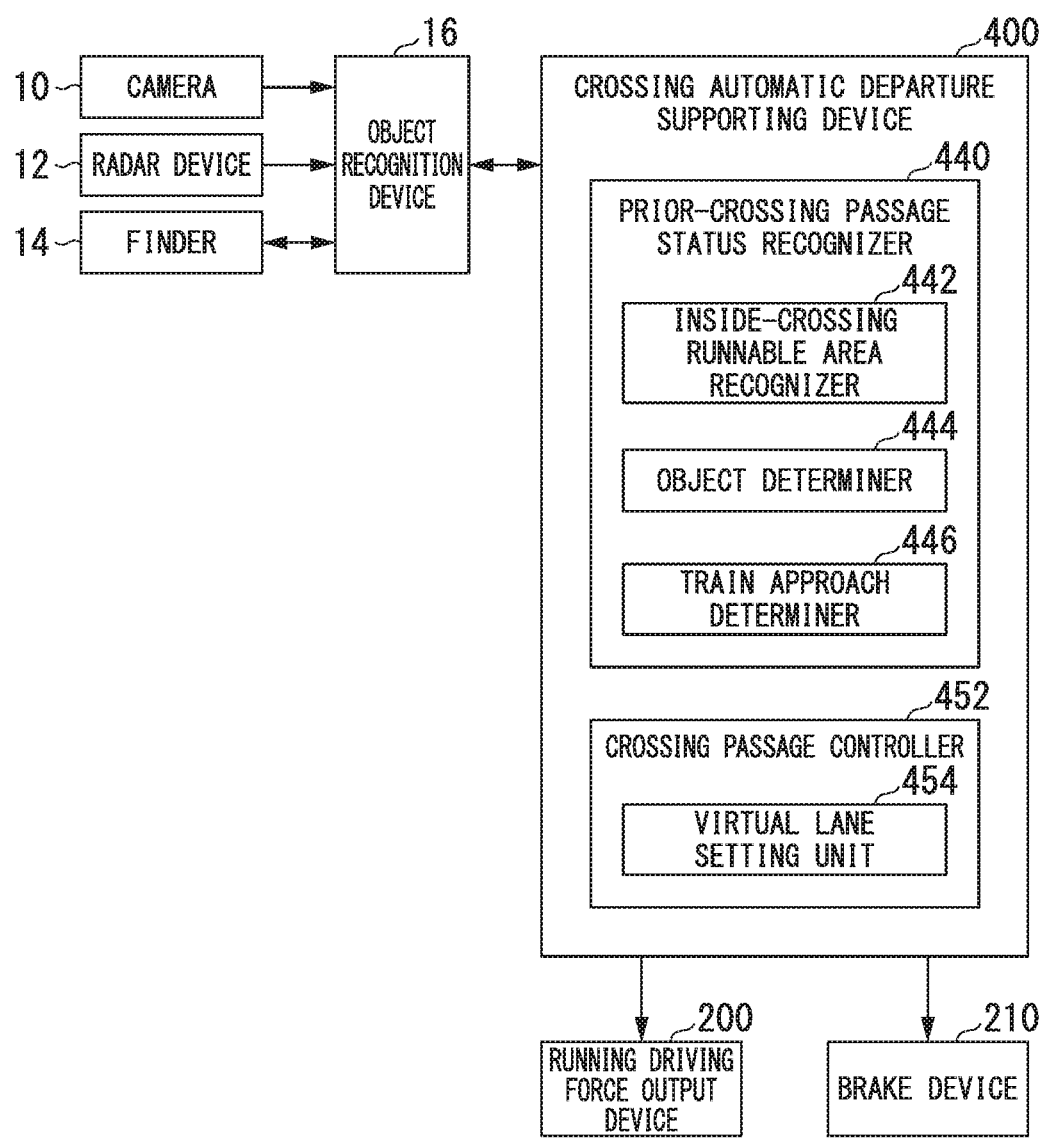
FIG. 26 is a configuration diagram of a crossing automatic departure supporting device according to a second embodiment.

Hereinafter, a second embodiment will be described. A vehicle control device according the second embodiment, for example, is a device that supports automatic departure at a crossing in accordance with a manual operation performed by a vehicle occupant of the subject vehicle. FIG. 26 is a configuration diagram of a crossing automatic departure supporting device 400 according to the second embodiment. In the drawing, the same reference signs are assigned to constituent elements common to the first embodiment.

A crossing automatic departure supporting device 400, for example, includes a prior-crossing passage status recognizer 440 and a crossing passage controller 452. The prior-crossing passage status recognizer 440 includes an inside-crossing runnable area recognizer 442, an object determiner 444, and a train approach determiner 446. The crossing passage controller 452 includes a virtual lane setting unit 454. Such constituent elements respectively have functions similar to those of the prior-crossing passage status recognizer 140, the inside-crossing runnable area recognizer 142, the object determiner 144, the train approach determiner 146, the crossing passage controller 152, and the virtual lane setting unit 154.

In other words, when an operation instruction is input, the crossing passage controller 452 performs a process similar to that of the crossing passage controller 152 according to the first embodiment by performing cooperation with the prior-crossing passage status recognizer 440. The crossing passage controller 452 outputs a forward movement instruction, a stop instruction, or the like according to a result of the process to a running driving force output device 200 or a brake device 210.

According to the second embodiment described above, similar to the first embodiment, the subject vehicle M can be caused to run in an appropriate route inside a crossing, and the subject vehicle M can be caused to pass through the crossing more safely.

<Hardware Configuration of Processor>

Figure 27:
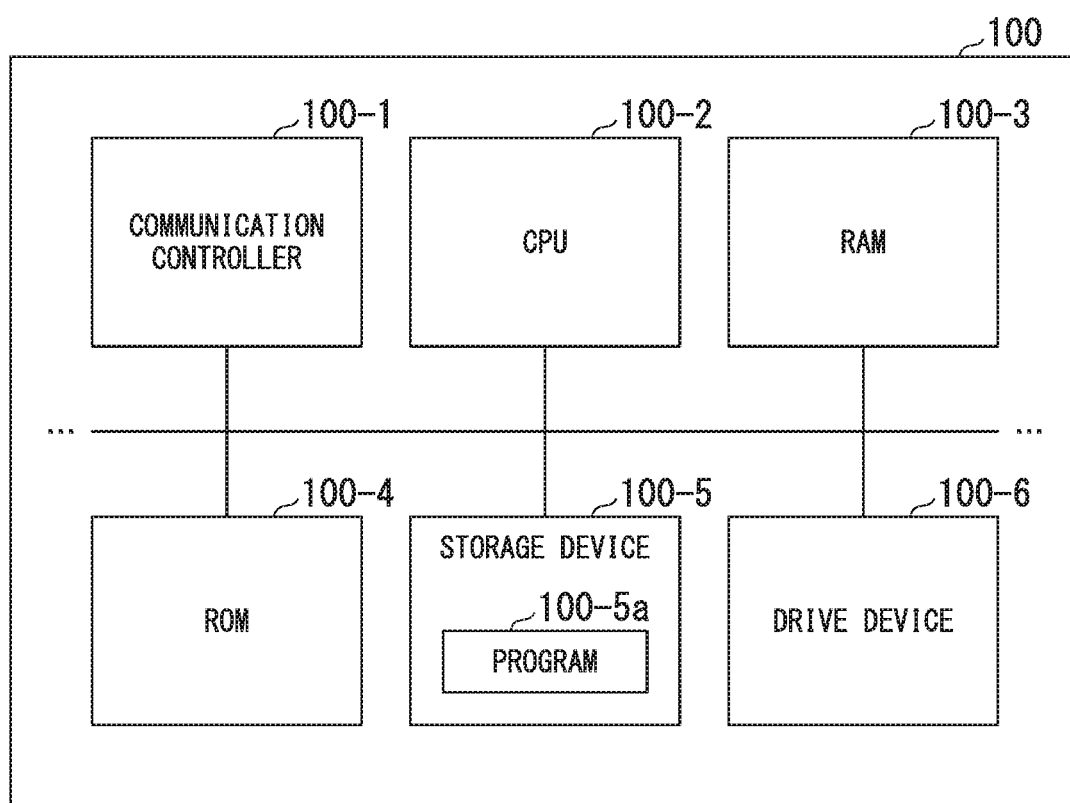
FIG. 27 is a diagram illustrating one example of the hardware configuration of a vehicle control device (an automatic driving control device or a crossing automatic departure supporting device).

FIG. 27 is a diagram illustrating one example of the hardware configuration of the vehicle control device (the automatic driving control device 100 or the crossing automatic departure supporting device 400). As illustrated in the drawing, the vehicle control device has a configuration in which a communication controller 100-1, a CPU 100-2, a random access memory (RAM) 100-3 used as a working memory, a read only memory (ROM) 100-4 storing a booting program and the like, a storage device 100-5 such as a flash memory or a hard disk drive (HDD), a drive device 100-6, and the like are interconnected through an internal bus or dedicated communication lines. The communication controller 100-1 communicates with constituent elements other than the vehicle control device. A program 100-5a executed by the CPU 100-2 is stored in the storage device 100-5. This program is expanded into the RAM 100-3 by a direct memory access (DMA) controller (not illustrated in the drawing) or the like and is executed by the CPU 100-2. In this way, some or all of the recognizer 130, the action plan generator 150, the prior-crossing passage status recognizer 440, and the crossing passage controller 452 are realized.

The embodiment described above can be represented as below.

A vehicle control device includes: an imaging unit that images the surroundings of a vehicle; a position specifying unit that specifies a position of the vehicle; a storage unit that stores a program, and a hardware processor that executes the program and is configured such that the hardware processor, by executing the program, recognizes presence of a crossing at a running destination of the vehicle on the basis of the position specified by the position specifying unit and map information and raises a degree of certainty in the presence of a crossing at the running destination of the vehicle on the basis of elements of specific colors, which represent presence of a crossing, included in an image captured by the imaging unit.

The embodiment described above can be represented as below.

A vehicle control device includes a detection device that is used for detecting presence of a concave part extending in a direction intersecting the advancement direction in an advancement direction of a vehicle, a storage unit that stores a program, and a hardware processor that executes the program and is configured such that the hardware processor, by executing the program, determines whether or not a concave part extending in a direction intersecting the advancement direction is present on the basis of an output of the detection device and recognizes the presence of a crossing in the advancement direction of the vehicle in a case in which it is determined that the concave part is present.

The embodiment described above can be represented as below.

A vehicle control device includes a storage unit that stores a program and a hardware processor that executes the program and is configured such that the hardware processor, by executing the program, recognizes the surroundings of a vehicle, sets a virtual lane in an area inside a crossing present in the advancement direction of the vehicle on the basis of a result of the recognition, and causes the vehicle to run inside the virtual lane and pass through the crossing by controlling one or both of steering and acceleration/deceleration of the vehicle.

The embodiment described above can be represented as below.

A vehicle control device includes an object detecting unit that detects an object present in the vicinity of a vehicle, a storage unit that stores a program, and a hardware processor that executes the program and is configured such that the hardware processor, by executing the program, causes the vehicle to move forward after stopping in front of a crossing, determines whether or not a train approaches the vehicle with a predetermined degree or more by referring to a detection result acquired by the object detecting unit in a state in which the vehicle has moved forward from the stop position in front of the crossing, and causes the vehicle to pass through the crossing in a case in which it is determined that the train has not approached the vehicle with a predetermined degree or more.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a detection device having a detection area in an advancement direction of a vehicle; and
a crossing recognizer determining whether or not a concave part extending in a direction intersecting the advancement direction is present on the basis of an output of the detection device and recognizing presence of a crossing in the advancement direction of the vehicle in a case in which a concave part is determined as being present,
wherein the detection device includes a finder that detects an object in the vicinity of the vehicle by emitting light and receiving reflected light, and
wherein the crossing recognizer determines whether or not a track extending in a direction intersecting the advancement direction is present on the basis of a detection result acquired by the finder and raises a degree of certainty in the presence of a crossing in a case in which the track is determined as being present.

2. The vehicle control device according to claim 1,
wherein the detection device includes a camera that images the vicinity of the vehicle, and
wherein the crossing recognizer determines whether or not a concave part is present on the basis of an image captured by the camera.

3. A vehicle control device comprising:
a detection device having a detection area in an advancement direction of a vehicle; and
a crossing recognizer determining whether or not a concave part extending in a direction intersecting the advancement direction is present on the basis of an output of the detection device and recognizing presence of a crossing in the advancement direction of the vehicle in a case in which a concave part is determined as being present,
wherein the crossing recognizer determines whether or not a plurality of concave parts are present parallel to each other and recognizes the presence of a crossing in a case in which it is determined that a plurality of concave parts are determined as being present in parallel with each other.

4. The vehicle control device according to claim 3,
wherein the detection device includes a camera that images the vicinity of the vehicle, and
wherein the crossing recognizer determines whether or not a concave part is present on the basis of an image captured by the camera.

* * * * *